(12) United States Patent
Costales

(10) Patent No.: US 6,683,716 B1
(45) Date of Patent: Jan. 27, 2004

(54) STEREOSCOPIC VIDEO/FILM ADAPTER

(75) Inventor: Bryan Costales, Boulder, CO (US)

(73) Assignee: SL3D, Inc., Boulder, CO (US)

( * ) Notice: Subject to any disclaimer, the term of this patent is extended or adjusted under 35 U.S.C. 154(b) by 0 days.

(21) Appl. No.: 09/565,662

(22) Filed: May 5, 2000

Related U.S. Application Data

(63) Continuation-in-part of application No. 09/354,230, filed on Jul. 16, 1999, now Pat. No. 6,275,335.

(51) Int. Cl.[7] .............................................. G02B 27/26
(52) U.S. Cl. ...................... 359/465; 359/462; 359/499
(58) Field of Search ................................. 359/465, 464, 359/462, 371, 376, 377, 499

(56) References Cited

U.S. PATENT DOCUMENTS

| | | | | |
|---|---|---|---|---|
| 2,255,631 A | 9/1941 | Schulman | ...................... | 88/39 |
| 2,639,653 A | 5/1953 | Fischer | .......................... | 95/18 |
| 3,712,199 A | 1/1973 | Songer, Jr. | ...................... | 95/18 |
| 3,876,283 A | 4/1975 | Judd | .......................... | 350/87 |
| 4,021,846 A | 5/1977 | Roese | ......................... | 358/92 |
| 4,072,967 A | 2/1978 | Dudley | ........................ | 354/79 |
| 4,189,210 A | 2/1980 | Browning et al. | .......... | 350/132 |
| 4,222,653 A | 9/1980 | Beiser | | |
| 4,290,675 A | 9/1981 | Beiser | ........................ | 354/112 |
| 4,303,316 A | 12/1981 | McElveen | .................... | 352/57 |
| 4,437,750 A | 3/1984 | Ikari | .......................... | 354/155 |
| 4,480,893 A * | 11/1984 | Fantone | ....................... | 352/57 |
| 4,568,160 A | 2/1986 | Krueger | ....................... | 352/86 |

(List continued on next page.)

FOREIGN PATENT DOCUMENTS

| | | |
|---|---|---|
| GB | 2298989 | 7/1997 |
| JP | 5007373 | 1/1993 |
| JP | 5091979 | 4/1993 |
| JP | 8152561 | 6/1996 |
| JP | 8240778 A | 9/1996 |
| JP | P10048538 A2 | 2/1998 |
| JP | 10096867 | 4/1998 |
| JP | 10282592 | 10/1998 |
| JP | 11271625 | 10/1999 |
| WO | WO 87/04263 | 7/1987 |
| WO | WO 97/22020 | 6/1997 |
| WO | WO 97/27798 | 8/1997 |
| WO | WO 97/37582 | 10/1997 |
| WO | WO 98/17169 | 4/1998 |
| WO | WO 98/25172 | 6/1998 |
| WO | WO 98/47097 | 10/1998 |
| WO | WO 98/48313 | 10/1998 |
| WO | WO 99/23522 | 5/1999 |
| WO | WO 99/23937 | 5/1999 |
| WO | WO 99/27843 | 6/1999 |
| WO | WO 99/47949 | 9/1999 |
| WO | WO 0/23845 | 10/1999 |
| WO | WO 99/60916 | 12/1999 |
| WO | WO 00/23845 | 4/2000 |
| WO | WO 00/36372 | 6/2000 |

OTHER PUBLICATIONS

Paper by Feris; "Novel 3–D Stereoscopic Image Technology"; *Proceedings of the International Society of Optical Engineers SPIE*; Apr. 1994; vol. 2177.

Paper by Hemayed et al.; "Investigation of Stereo–based 3D Surface Reconstruction"; *Proceedings of SPIE Three Dimensional Image Capture*; Mar. 1997; vol. 3023.

(List continued on next page.)

*Primary Examiner*—Mark A. Robinson
(74) *Attorney, Agent, or Firm*—Sheridan Ross P.C.

(57) ABSTRACT

A method for creating stereoscopic images wherein an image altering filter is interposed at the aperture stop of a relay lens system. The relay lens system forms an adapter between the ocular hole of an instrument and the oculars of an instrument. When a pair of such adapters are used in a binocular instrument, and when the adapters are correctly oriented, a 3D image is made available for viewing.

76 Claims, 27 Drawing Sheets

U.S. PATENT DOCUMENTS

| | | | |
|---|---|---|---|
| 4,601,551 A | 7/1986 | Pettingell et al. | 350/525 |
| 4,651,201 A | 3/1987 | Schoolman | 358/98 |
| 4,761,066 A | 8/1988 | Carter | 350/510 |
| 4,763,968 A | 8/1988 | Minami et al. | 350/516 |
| 4,862,873 A | 9/1989 | Yajima et al. | 128/6 |
| 4,896,966 A | 1/1990 | Boisseau et al. | 356/442 |
| 5,029,338 A | 7/1991 | Aichinger et al. | 378/99 |
| 5,115,339 A | 5/1992 | Martino et al. | 359/378 |
| 5,222,477 A | 6/1993 | Lia | 128/6 |
| 5,264,925 A | 11/1993 | Shipp et al. | 358/44 |
| 5,471,237 A | 11/1995 | Shipp | 348/46 |
| 5,539,572 A | 7/1996 | Greenberg et al. | 359/368 |
| 5,592,328 A | 1/1997 | Greenberg | 359/389 |
| 5,606,363 A | 2/1997 | Songer | 348/49 |
| 5,649,897 A | 7/1997 | Nakamura et al. | 600/111 |
| 5,671,007 A | 9/1997 | Songer | 348/49 |
| 5,706,128 A | 1/1998 | Greenberg | 359/385 |
| 5,731,894 A | 3/1998 | Gross | 359/386 |
| 5,743,847 A | 4/1998 | Nakamura et al. | 600/166 |
| 5,745,163 A | 4/1998 | Nakamura et al. | 348/46 |
| 5,751,341 A | 5/1998 | Chaleki et al. | 348/65 |
| 5,796,454 A | 8/1998 | Ma | 349/98 |
| 5,805,205 A | 9/1998 | Songer | 348/49 |
| 5,828,487 A | 10/1998 | Greening et al. | 359/466 |
| 5,835,264 A | 11/1998 | Tandler | 359/377 |
| 5,865,829 A | 2/1999 | Kitajima | 606/3 |
| 5,867,312 A | 2/1999 | Greenberg | 359/390 |
| 5,907,434 A | 5/1999 | Sekine et al. | 359/462 |
| 5,914,810 A | 6/1999 | Watts | 359/464 |
| 5,964,696 A | 10/1999 | Mihalca et al. | 600/166 |
| 5,975,703 A * | 11/1999 | Holman et al. | 359/501 |
| 6,020,993 A | 2/2000 | Greenberg | 359/363 |
| 6,151,164 A | 11/2000 | Greening et al. | 359/466 |
| 6,271,895 B2 | 8/2001 | Takagi et al. | 349/11 |
| 6,320,696 B1 | 11/2001 | Greenberg et al. | 359/377 |

OTHER PUBLICATIONS

Paper by Udupa; "3D Imaging: Where do we stand?"; *SPIE Proceedings International Symposium on multispectral Image proceesing*; Sep. 1998; vol. 3545.

Paper by Carter; "The advantage of single lens stereopsis"; *SPIE Proceedings of Stereoscopic Displays and Applications II*; 1992; vol. 1669.

Paper by Carter; "Single Lens Stereoscopy: A (sic) Historical and Technical Review"; *SPIE Proceedings Stereoscopic Display and Virtual Reality Systems III*; Apr. 1996; vol. 2633.

Frank L. Pedrotti et al., "Chapter 19: Theory of Multilayer Films" *Introduction to Optics* (Prentice Hall, 1993) pp. 391–404.

Eugene Hecht, *Optics*, $4^{th}$ Edition (Addison Wesley, 2002), pp. 171–173.

Untitled document located at http://web.mit.edu/2.710/www/2.710–wk5–a–short.pdf, pp. 1–15.

Untitled document located at http://physics.okstate.edu/ackerson/optics/Stops$_{13}$ pupils.htm, pp. 1–3.

"Stops and Apertures," located at http://electron9.phys.utk.edu/optics421/modules/m3/Stops.htm, pp. 1–8.

* cited by examiner

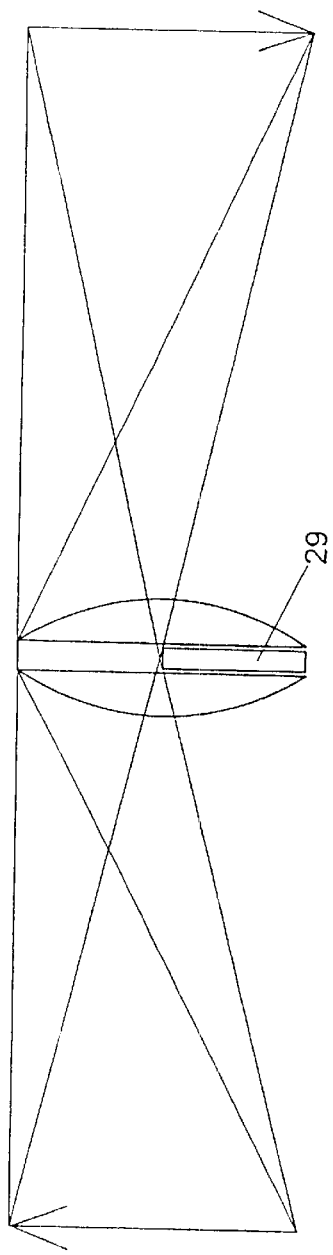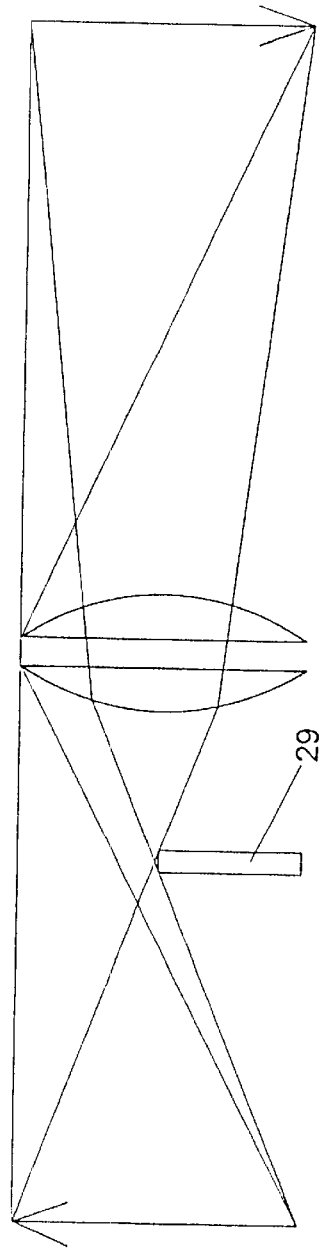
FIG. 8A
FIG. 8B

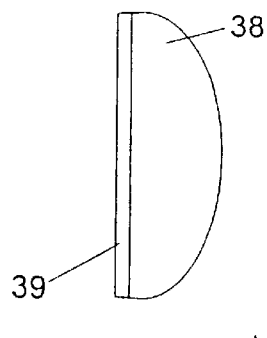
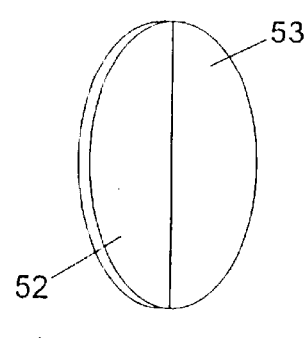
FIG. 21A  FIG. 21B
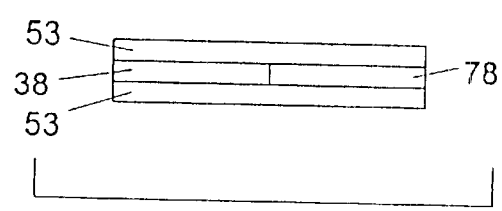
FIG. 21C
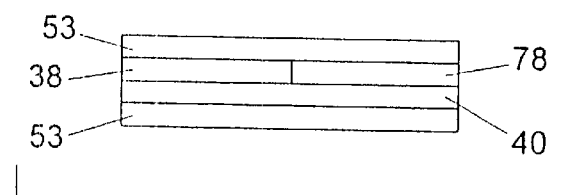
FIG. 21D
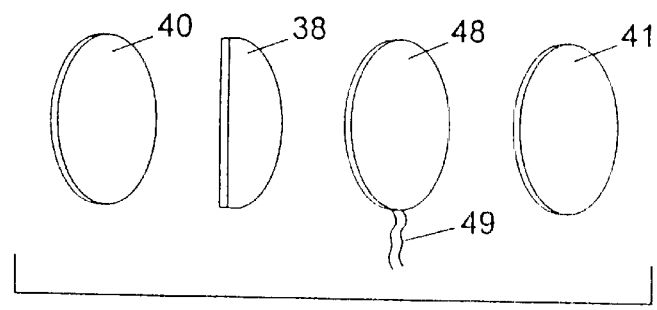
FIG. 22

STEREOSCOPIC VIDEO/FILM ADAPTER

CROSS REFERENCE TO RELATED APPLICATION

This application is a division of U.S. patent application Ser. No. 09/354,230, filed Jul. 16, 1999, now U.S. Pat. No. 6,275,335, which is incorporated herein by reference in its entirety.

BACKGROUND OF THE INVENTION

The present invention relates to a system for producing stereoscopic images with a single lens. We show that this system can be extended to a microscope, to microscope ocular adapters, to a stereoscopic video lens, and to a stereoscopic adapter for any video capable device.

Optical systems such as a microscope typically produce a two-dimensional image of the subject under view. In a microscope an intermediate image is viewed through ocular eyepieces or is focused at an image plane where it may be recorded with a video camera. The usual microscope contains a single objective lens, which functions to produce a magnified image of the subject to be viewed, and either a single ocular for viewing with a single eye, dual oculars for viewing with right and left eyes, or an access hole for recording magnified images with a still or video camera. Because the image is produced with a single objective lens, the viewer has had no perception of depth.

Heretofore, proposals have been made in prior art for stereoscopic viewing with microscopes that use a single objective lens. All of them suffer from problems and limitations.

Carter 1988, in U.S. Pat. No. 4,761,066, proposes orthogonally opposing linear polarizing filters adjacent to the objective lens with left and right matching linear polarizing filters in the binocular oculars. This method suffers from three problems. First, the position of the orthogonally opposing linear polarizing filters are adjacent to the objective which prevents use with powers higher than 10×. Second, the use of linear polarizing filters in the oculars causes alignment problems when the oculars rotate as when focusing. And Third, the use of linear polarizing filters near the image plane causes distortion and visual noise from contaminants.

Greenberg 1999, in U.S. Pat. No. 5,867,312, proposes a variation on Schulman 1941, in U.S. Pat. No. 2,255,631, wherein polarized or colored light from two or more axially differentiated paths is projected either down through a single objective or up through the specimen to be viewed. The differently linearly polarized light is then viewed by the appropriate oculars thus producing a stereoscopic effect. This method works well at low magnifications, but produces reduced stereoscopic information as magnification increases. Because polarized light is transmitted through the subject, polarizing subjects can severely distort the quality or perceptibility of the perceived image. Finally note that Schulman suffers from many of the problems of dual-lens that lead to viewer discomfort.

Tandler 1998, in U.S. Pat. No. 5,835,264, utilizes an approach that parallels Greenberg 1999, wherein linearly polarized light is projected either down through a single objective or up through the specimen. This approach shares the same limitations as Greenberg 1999.

Songer 1973, in U.S. Pat. No. 3,712,199, discloses a method for producing stereoscopic motion pictures using only a single lens. That approach utilized anaglyphic filters at the aperture stop, a technique that has been demonstrated to not workwell with Video. Songer 1997, in U.S. Pat. No. 5,671,007, discloses a method for producing stereoscopic video using only a single lens. That approach requires an active switching occluding device, termed a "light-valve," to be placed at the aperture stop of the lens. Use of an active element in a lens is more costly to install, more difficult to maintain, and, when it fails, significantly degrades the optical properties of the lens. The method we disclose herein places a passive system at the aperture stop of the lens. A passive system is less expensive to install, requires no maintenance, and cannot fail. Because the passive component only effects the orientation of polarization, it is essentially invisible, and thus does not change the nature of the lens unless that lens is used in conjunction with external components to create a stereoscopic effect. Songer also advises using an off-the-shelf light-valve, without disclosing the nature or construction of such a light valve. Such components typically use opposing polarization at the aperture stop, thus preventing them from being used to photograph the sky, water, or reflecting surfaces that effect polarization. The method we disclose herein uses a single polarizer ahead of the aperture stop, which allows those subjects to be successfully photographed.

Shipp in U.S. Pat. No. 5,471,237 discloses an active shutter mounted transversely across the optical tube. No mention is made of where in the light path such a shutter should be mounted. Like Songer above, Shipp uses an active shutter inside the lens system which produces a similar disadvantageous failure mode.

Lia in U.S. Pat. No. 5,222,477 discloses two holes on either side of a single lens. Lia confuses dual lens with single lens technologies. His "left and right pupils" emulate the human-eye method (dual-lens) of viewing. Lia also fails to specify that the "left and right pupils" must be placed at the aperture stop or one of its conjugates.

Greening in U.S. Pat. No. 5,828,487 discloses a switching device between the lens system and the camera. Greening fails to specify that the opaque leaf must be positioned at the aperture stop or at one of the conjugates of the aperture stop. The use of a mechanical opaque shutter leads to a failure mode which causes the shutter to center and thus make the entire system unusable.

Watts in U.S. Pat. No. 5,914,810 and GB2298989 places an active "optical shutter" that "constitutes the iris" inside a lens. The active optical shutter is the same as the active light-valve above specified by Songer for motion pictures, but here used for an endoscope. This optical shutter suffers from the same drawbacks as the light-valve of Songer. The specification of the iris fails to recognize that the aperture stop or any conjugate of the aperture stop are the preferred location for the optical shutter.

SUMMARY OF THE INVENTION

It is therefore a general object of the invention to provide an optical system which largely overcomes the above-mentioned problems and limitations associated with prior art microscopes and video lenses.

A specific object of the invention is to disclose and claim the underlying method of producing a stereoscopic effect with just a single lens.

A specific object of the invention is to provide a stereomicroscope which is a significant improvement over Carter, 1988. One improvement is to replace the two polarizing filters at the oculars with a single polarizing beam splitter. Another improvement is to set the location of the filter to the aperture stop, or to one of the aperture stop's conjugates.

A specific object of the invention is to provide a video camera adapter suitable to produce stereo-microscopic images on any microscope that uses a single objective lens. One implementation is to use an electric switched quarter-wave retarder and a final linear polarizing filter in conjunction with a modified objective to produce a video image. Another implementation is to use an adapter between the camera and an unmodified microscope to produce stereoscopic images.

A specific object of the invention is to provide an ocular and an ocular adapter, pairs of which can produce stereoscopic images when used in conjunction with any unaltered single objective binocular microscope.

A specific object of the invention is to provide a video lens system, which is a significant improvement over Songer 1997, capable of producing a stereoscopic effect when in conjunction with any standard video camera body, as on a microscope.

A specific object of the invention is to provide an adapter than can produce a stereoscopic effect when used in conjunction with any standard imaging lens, such as a microscope's objective, and camera body.

A specific object of the invention is provide a stereoscopic light-valve that can be used in or with any imaging lens, such as a microscope objective, a video lens, or a motion picture lens.

These and other objects and features of the invention will become more fully apparent when the following detailed descriptions are read in conjunction with the accompanying drawings.

BRIEF DESCRIPTION OF THE DRAWINGS

FIGS. 8A and 8B together illustrate that the filter must reside at the aperture stop, not near the aperture stop.

FIGS. 21A, 21B, 21C, and 21D show the cut edge that needs treatment, the coating on glass, and a glass sandwich of the optical-encoding filter, and a glass sandwich of the optical-encoding filter and the leading linear polarizing filter.

FIG. 22 shows the relationship of the four components: a leading linear polarizing filter, a passive half-wave retarder, a electric switched quarter-wave retarder, and a trailing linear polarizing filter

DETAILED DESCRIPTION OF THE INVENTION

A. The Means of Encoding

The first embodiment is a means for distinguishing foreground from background information in a single lens system. This system differs from traditional means of detecting and displaying depth information that rely on two or more lenses to create parallactic views. Instead of relying on parallactic displacement to determine the depth and positions of objects, this single-lens system utilizes information encoded into the out-of-focus areas of the image. This embodiment deals with the method for encoding that depth information into the out-of-focus areas, and defers any claim to viewing and interpreting that depth information to standard stereographic techniques.

Among all single lensing systems are two general classes of lensing systems used to produce images. The first form is any lensing system capable of projecting a subject as an image of that subject onto an image plane. One example of such an implementation of this approach is the lens of a video camera. The second form is any lensing system capable of projecting a subject as an aerial image suitable for direct viewing by a human eye (where the retina of the eye is another image plane). One implementation of this approach is a microscope ocular. For the purposes of preliminary discussion, the two forms will be considered identical, and we describe them showing only the first. This reduction in the scope of the discussion is not, however, intended to be limiting because both approaches project a subject as an image of that subject onto an image plane.

Figures 1A, 1B:
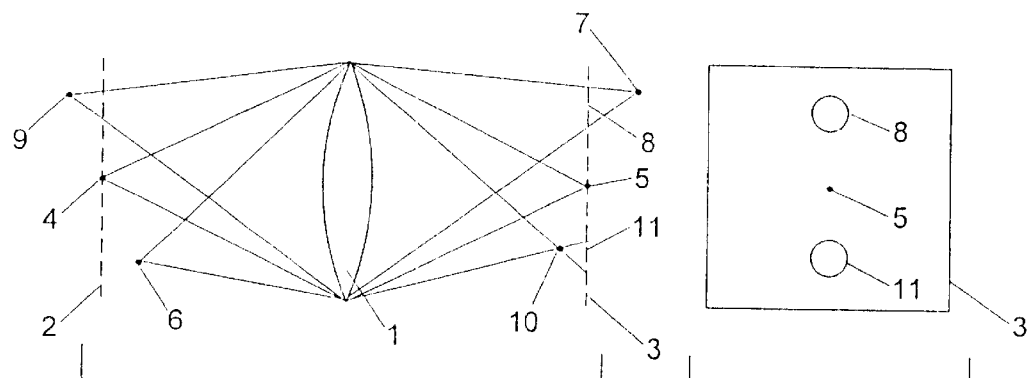
FIGS. 1A and 1B show two views of foreground and background subject points imaged on an image plane.

FIG. 1A shows three points, 4, 6 and 9, relative to the subject plane represented by the dashed line 2. A lens 1 gathers light from point 4 on the subject plane 2 and projects an image of that point onto the image plane 3, indicated by the dashed line, at position 5. The image point at position 5 is in-focus because it is positioned precisely at the image plane.

Point 9 lies behind the subject plane 2 (further from the lens 1 than is the subject plane) and is thus a background point. When a background point is projected onto the image plane, as point 9 is projected to image position 10, it is focused at a point in front of the image plane 3 (nearer to the lens than is the image plane). The area, as at region 11, where the light that forms the image for point position 10 intersects the image plane, is an out-of-focus image of point 9, the background point. An out-of-focus image of a point is also called the circle of confusion.

Point 6 lies in front of the subject plane 2 (closer to the lens 1 than is the subject plane) and is thus a foreground point. When a foreground point is projected onto the image plane, as point 6 is projected to image position 7, it is focused at a point in back of the image plane 3 (further from the lens than is the image plane). The area, as at region 8, where the light that forms the image for point position 7 intersects the image plane, is an out-of-focus image of point 6, the foreground point. That out-of-focus region is also called the circle of confusion.

FIG. 1B shows the image plane 3 of FIG. 1A rotated 90° so that its back faces outward from the page. This back view of the image plane 3 shows the image of the in-focus point at location 5. The circle of confusion for the foreground out-of-focus point is shown at the top location 8, and the circle of confusion for the background out-of-focus point is shown at the bottom location 11.

The circles of confusion are visually identical for region 8 (created from the background point) and region 11 (created from the foreground point). When both points are of equal color and intensity, and when both produce equal size regions, it is not possible to distinguish one from the other, that is, it is not possible to distinguish background from foreground information.

Figures 2A, 2B:
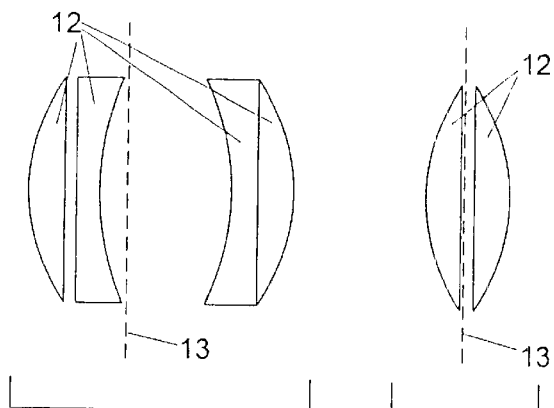
FIGS. 2A and 2B show two representations of lens systems and the position of the aperture stop in each.

FIG. 2A shows one common implementation of an imaging lens system 12. In it, the position of its aperture stop is indicated by the dashed line at 13. The aperture stop is that position within a lensing system where optical control elements may be placed without being imaged. One such common control element is an iris for altering the amount of light passing through the lens system. Note that the iris is sometimes referred to as the aperture, and that this use of the term aperture is distinct from the term "aperture" stop we use herein. FIG. 2B shows a diagrammatic representation of a lensing system 12 used for illustration. In it, the location of the aperture stop is indicated by the dashed line 13.

Figure 3:
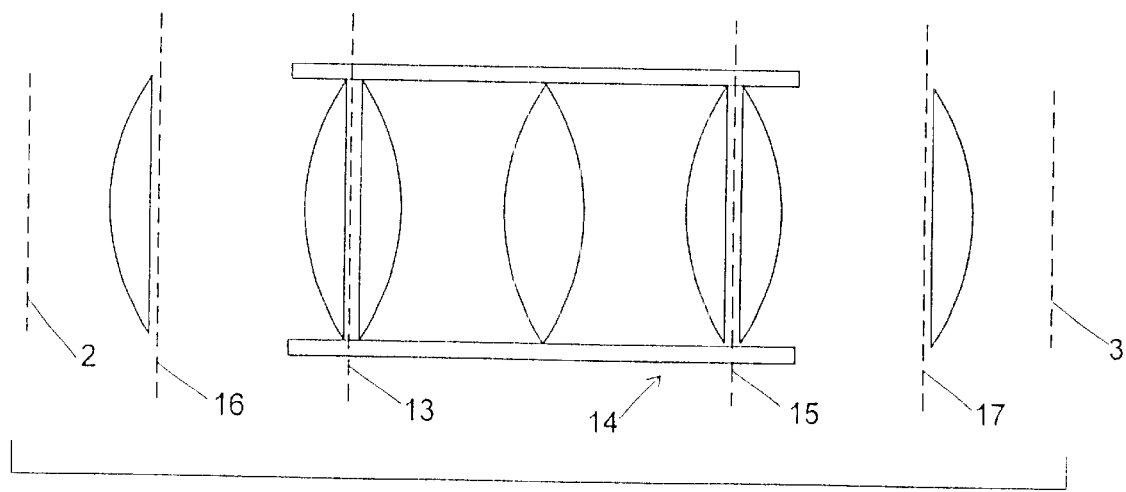
FIG. 3 shows that a lens system may have an aperture stop and many conjugates of that aperture stop.

FIG. 3 shows that some lensing systems can have multiple aperture stops. In general, the aperture stop inside the lens system 14 nearest the subject plane 2, is called the aperture stop of the lens system. In FIG. 3, the aperture stop of the lens system is indicated by the dashed line 13. Other aperture stops, called conjugates of the aperture stop, can coexist in a lens system as shown in FIG. 3 by the dashed line 15. When a new aperture stop is created in front of or behind the lens system, they too are called conjugates of the aperture stop. The conjugate in front of the lens system is indicated by the dashed line 16. The conjugate behind the lens system is indicated by the dashed line 17. Any conjugate of the aperture stop is included in this embodiment. The behavior of the encoding is unaffected by whether or not the actual aperture stop is used, or if one of the conjugates of the aperture stop is used, or if the encoding method to be disclosed is placed in any combination of the aperture stop or any of its conjugates.

Figure 4:
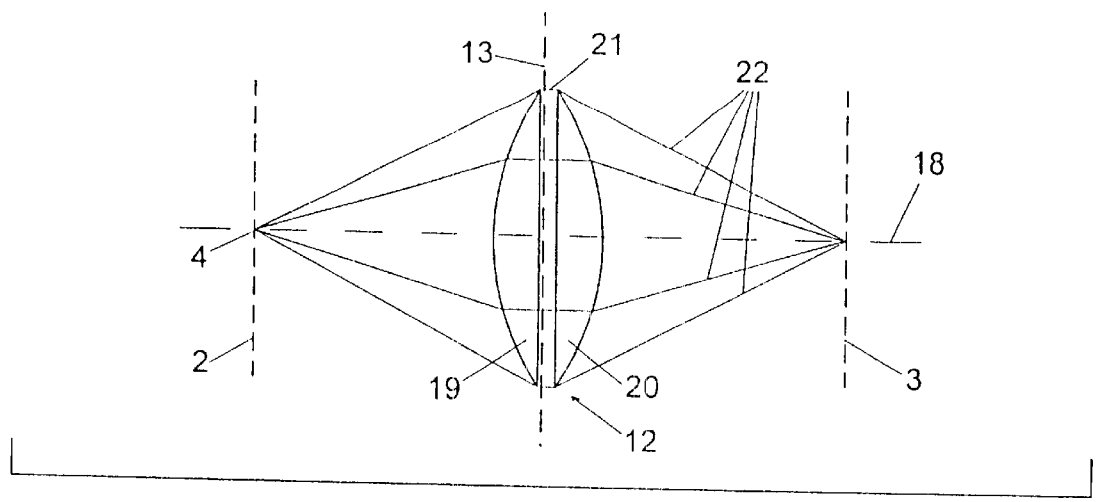
FIG. 4 shows that light travels parallel to the axis of the system through the aperture stop.

FIG. 4 shows the simplified diagram of a lens system 12. The aperture stop, indicated by dashed line 13, is a plane perpendicular to the principal ray (the main axis of light) 18 through the lens system. The subject point 4 rests on the subject plane, indicated by the dashed line 2. Light rays from point 4 are indicated by lines 22. Those light rays expand from point 4 on the subject plane 2, are brought into parallel by the leading lens element 19 of the lens system, and then are focused on the image plane 3 by the final lens element 20 of the lens system. Region 21 is the gap between the lens system elements where light runs parallel to the principal ray (the main axis of light) 18 through the lens system. The aperture stop of this system is indicated by dashed line 13, and is the plane through which the light first starts to travel parallel to the main axis of the system.

Figure 5:
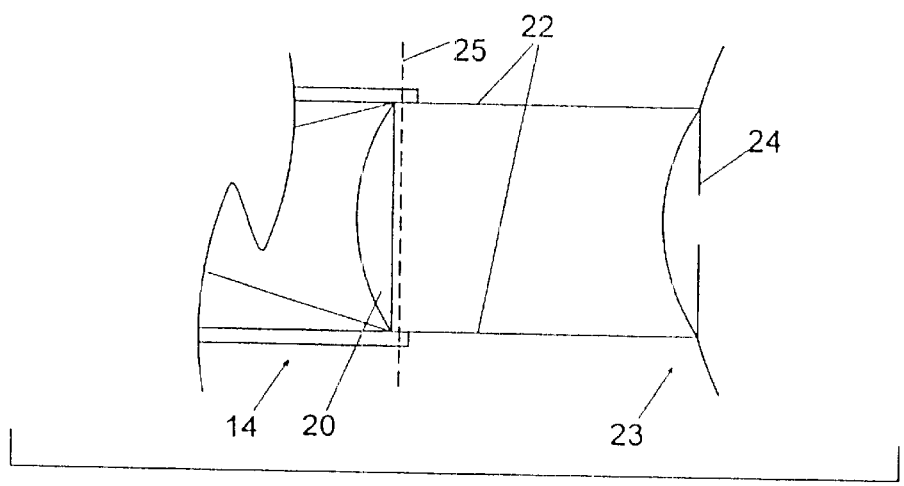
FIG. 5 shows the result of an aerial image projected into a human eye.

FIG. 5 shows part of a lensing system 14, the rear element 20 of which is designed to produce an aerial image, as represented by the lines 22 representing light paths. An aerial image is one in which the light travels parallel (as if focused on infinity), and is an image suitable for direct viewing by the human eye. The human eye 23 perceives the parallel light produced by the aerial image and focuses it on the retina of the eye (not shown). The plane where the parallel light first exits the lens system 14 is another conjugate of the aperture stop. This particular conjugate has the special name "exit pupil" and is shown by the dashed line 25. The plane of parallel light that is lastly parallel before being focused on the retina has the special name "entrance pupil." That plane, the iris of the eye 24, is another conjugate of the aperture stop. Lenses in addition to the human eye also have entrance pupils. A camera lens, for example, also images parallel light at its front lens element, thus creating an entrance pupil. For the purposes of this embodiment, the entrance pupil and exit pupil are also considered usable conjugates of the aperture stop.

Figure 6:
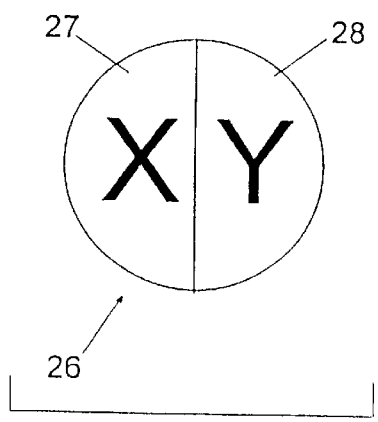
FIG. 6 shows a hypothetical optical-encoding filter.

The subject invention manipulates the image or part of the image to encode the image with depth information. FIG. 6 shows the front view of an optical-encoding filter 26, the left half 27 of which changes light in manner X and the right half 28 of which changes light in the manner Y. For example, one implementation is an X that is a red filter, and a Y that is a cyan filter. Another implementation is an X that is horizontal polarization and a Y that is vertical polarization. The implementation that yields a difference between X and Y is unimportant to this embodiment at this point in the disclosure. The important point is that X and Y differ in how they effect the light. This manipulation of the light creates two different image signals.

Figure 7:
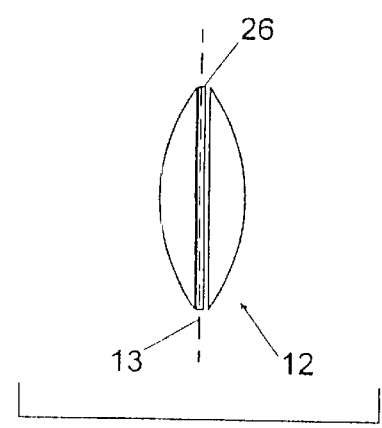
FIG. 7 shows the hypothetical optical-encoding filter interposed at the aperture stop of a lens system.

FIG. 7 shows a lensing system 12 into which the optical-encoding filter 26, of FIG. 6, has been placed at the aperture stop indicated by dashed line 13. The placement of the optical-encoding filter at the aperture stop is critical. The aperture stop, or one of its conjugates, is the one place in the light path where the optical-encoding filter will only effect the quality of light, and will not produce an image of itself. Near the aperture stop will not work. FIGS. 8A and 8B show diagrammatically why the optical-encoding filter must be at the aperture stop. If the optical-encoding filter is an occlusion that blocks half the aperture stop, as at 29 in FIG. 8A, it reduces the total light passed through the lens system by 50%, or one stop and in no other way effects the image. If that occlusion is moved from the aperture stop, as at 29 in FIG. 8B, the effect is much different. If, for example, it is located a distance that is equal to the lens diameter away from the aperture stop, on an f/2 lens, the effective lens speed reduces dramatically. For light entering the lens 27° off-axis the effective speed of the lens reduces to f/5. For light entering the lens 45° off axis the effective speed of the lens reduces to f/10000, effectively zero transmission of light. The visual effect of an image produced by such a lens is one of a vignetted picture, or of tunnel vision. The further the filter is from the aperture stop, the more pronounced this aberration becomes. Actual experience shows visually perceptible vignetting when, on an f/2, 50 mm lens, the occlusion is only 2 mm from the aperture stop.

Figure 9A:
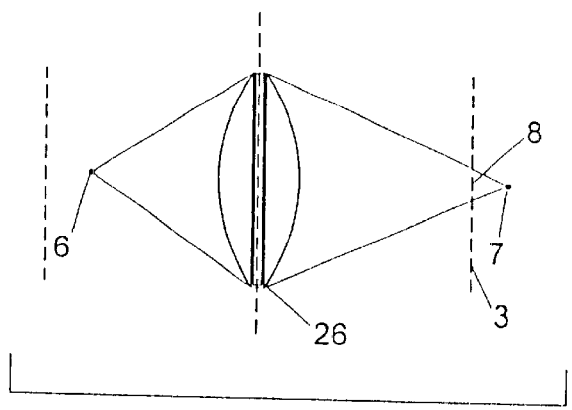
FIGS. 9A and 9B show two views of the out-of-focus area of a foreground point when the hypothetical filter is used.
Figure 9B:
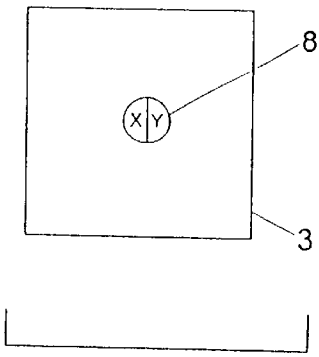

FIG. 9A shows the effect of a properly placed optical-encoding filter 26 when a foreground point 6 is projected through it. The foreground point 6 focuses to point 7 behind the image plane 3, thereby creating the circle of confusion (out-of-focus area) at 8 on the image plane. FIG. 9B shows the same image plane 3 rotated so that its back side may be fully viewed. The circle of confusion 8 takes on the characteristics of the optical-encoding filter 26. That is, for example, if X is red, and Y cyan, those colors would appear in the identical regions of the circle of confusion 8, with red to the left and cyan to the right.

Figure 10A:
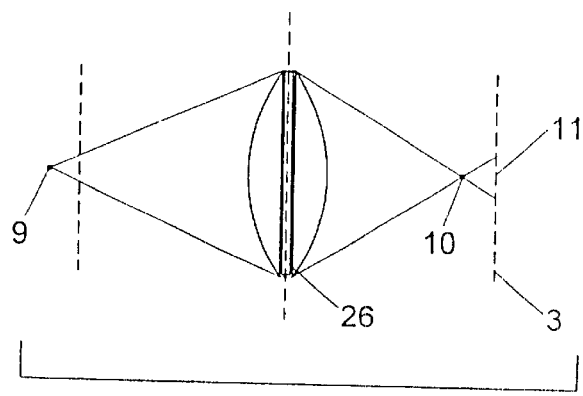
FIGS. 10A and 10B show two views of the out-of-focus area of a background point when the hypothetical filter is used.
Figure 10B:
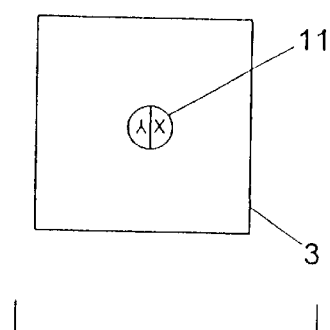

FIG. 10A shows the effect of a properly placed optical-encoding filter 26 when a background point 9 is projected through it. The background point focuses to point 10 in front of the image plane 3, then continues, crossing through itself, striking the image plane and thereby creating the circle of confusion (out-of-focus area) 11 in the image plane 3. FIG. 9B shows the same image plane 3 rotated so that its back side may be fully viewed. The circle of confusion 11 takes on the inverse characteristics of the filter 26. Because the circle of confusion is reversed and inverted, the characteristics of the filter are also reversed and inverted from those at 8 in FIG. 9B.

The introduction of a manipulation means such as a specially composed optical-encoding filter at the aperture stop of an imaging lensing system has caused foreground and background circles of confusion to differ in a readily detectable manner when projected onto the image plane. This difference can produce a 3D effect when viewed by humans and can yield depth data for use to automated processes.

Figure 11A:
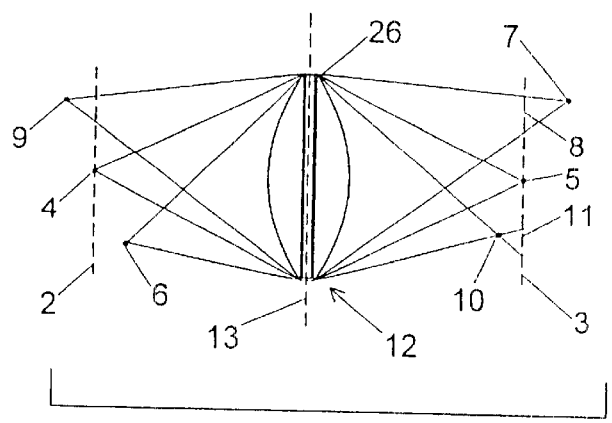
FIGS. 11A and 11B show the combined effect of the hypothetical optical-encoding filter on the foreground and background out-of-focus regions.
Figure 11B:
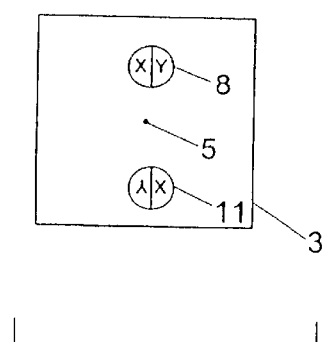

FIGS. 11A and 11B show the combined effect of the optical-encoding filter 26 at the aperture stop represented by the dashed line 13 in the lens system 12. FIG. 11A shows that the background point 9 is focused to a point in front of the image plane at 10. Where the light for image point 10 continues to the image plane, an out-of-focus area is created at 11. FIG. 11B shows that the out of focus area for the background point 11 takes on the inverse characteristics of the optical-encoding filter 26. FIG. 11A also shows that the foreground point 6 is focused to a point in back of the image plane at 7. Where image point 7 passes through the image plane an out-of-focus area is created at 8. FIG. 11B shows that the out-of-focus area for the foreground point 8 takes on the characteristics of the optical-encoding filter 26. FIG. 11A also shows that any point on the subject plane 4 is focused onto a point on the image plane 5. All points on the subject plane 2 will always be in-focus on the image plane 3. When this system produces a union of foreground and background information (as when 3D is viewed in 2D without special equipment) the result is an unambiguous image that can be viewed in 2D comfortably.

Figures 12A, 12B, 12C:
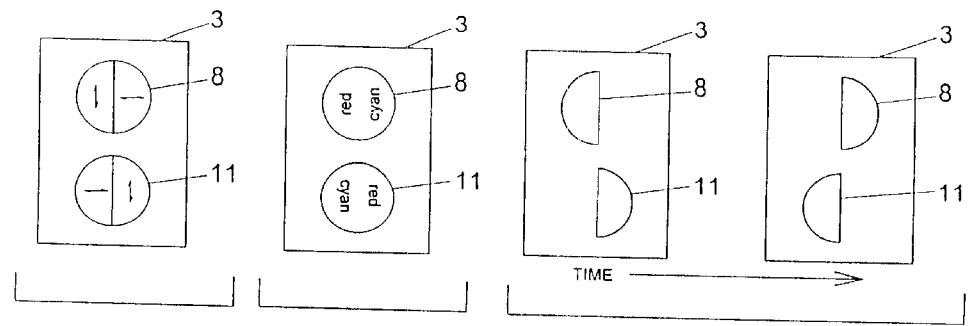
FIGS. 12A, 12B, and 12C show three actualizations derived from the hypothetical optical-encoding filter and their effect on the foreground and background out-of-focus areas.

FIGS. 12A, 12B, and 12C show four image planes 3, each showing the result of an optical-encoding filter used to differentiate background from foreground circles of confusion. FIG. 12A shows the result of an optical-encoding filter that uses vertical polarization to the right and horizontal polarization to the left (recall that the view is from the back side of the image plane 3). The foreground circle of confusion 8 is polarized in the same pattern as was the filter. The background circle of confusion 11 is polarized in the reverse pattern. FIG. 12B shows the result of an optical-encoding filter that has red to the right and cyan to the left. The foreground circle of confusion 8 shows the same red/cyan ordering as did the filter. The background circle of confusion 11 shows the reverse pattern.

FIG. 12C shows the result of another type of manipulation by a sequential filter. In such a filter, first a portion such as half of the aperture stop is covered and the resulting image stored. Then the second portion or half of the aperture stop is covered and the first is uncovered, and the resulting image stored. FIG. 12C shows the difference between background circles of confusion 11 and foreground circles of confusion 8 as two discretely different image planes 3 are produced over a time interval.

Humans are able to derive a 3D effect from any of these optical-encoding implementations. All that is needed is for one eye to only see the half-circles of confusion produced by half the optical-encoding filter, and for the other eye to see the half-circles of confusion produced by the other half of the optical-encoding filter. Both eyes are able to see all the information from both halves when that information is in-focus at the image plane.

Figures 13A, 13B, 13C:
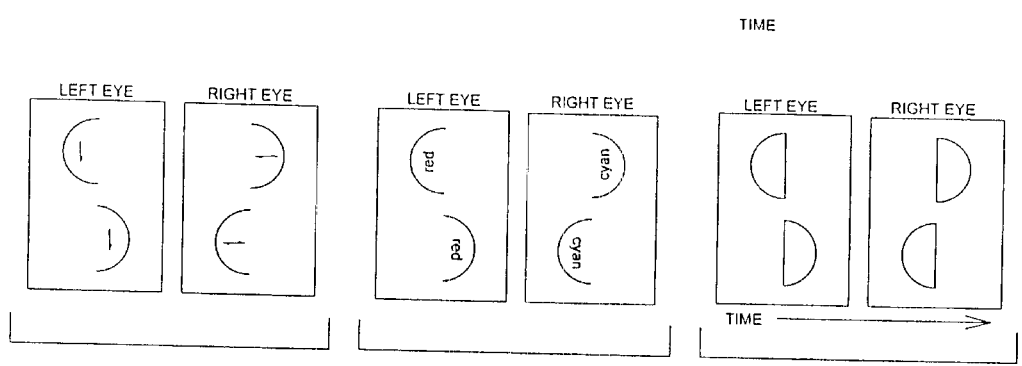
FIGS. 13A, 13B, and 13C show the effect of the three actualizations on the human eye.

FIGS. 13A, 13B, and 13C show what each eye sees when each is covered with an appropriate complimentary material. FIG. 13A, for example, shows what each eye sees when one is covered with vertical polarizing material and the other with horizontal polarizing material. FIG. 13B shows what each eye sees when one is covered with a red filter and the other is covered with a cyan filter. And FIG. 13C shows what each eye sees when one is covered with opaque material when viewing the first of a sequence of images, and the other eye is covered with opaque material when viewing the second of a sequence of images. Naturally such a sequence is presented sufficiently rapidly for persistence of vision to have effect.

Figures 14A, 14B, 14C, 14D, 14E:
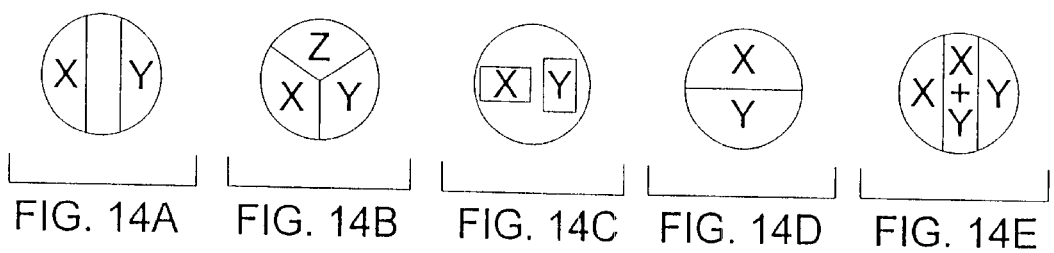
FIGS. 14A, 14B, 14C, 14D, and 14E show variations on the division of the optical-encoding filter.

Finally note that the optical-encoding filter does not have to be a bifurcated circle. There is advantage to optical-encoding only the sides and leaving the middle clear, as in FIG. 14A, where the clear vertical strip up the middle increases vertical resolution of the system while reducing the perceived 3D effect. FIG. 14C shows that the optical-encoding can divide the aperture stop into more than just two pieces. Three pieces can encode a vertical component, thereby providing vertical as well as horizontal head-motion parallax when viewing. FIG. 14C shows that the aperture stop can be encoded in novel ways, this particular example being more suitable to machine interpretation than for human viewing. FIG. 14D shows that the optical-encoding can be rotated to a horizontal position to turn off the human perceived 3D effect, as when 3D is confusing during a medical procedure. FIG. 14E shows that the optical-encoding components can overlap. This causes higher light loss but that detriment can be overcome by making the components translucent or neutral density.

B. The Theories

There are two theories why this method can produce images that can be viewed by humans in a manner that is clearly perceptible as a stereoscopic experience. Neither, as of this writing, has been proven, but they are included here for completeness of disclosure.

One theory holds that the brain can meld the two out-of-focus areas because they have the property of "self-similarity." That is, the bilateral symmetry of the optical-encoding allows the brain to "glue" the two generated sides of information back together, thus recognizing that foreground differs from background. This theory implies that the two parts of the optical-encoding at the aperture stop must be bilaterally symmetric, and that non-symmetric encoders will fail to produce a stereoscopic image, a supposition that has not yet been tested.

Figure 15:
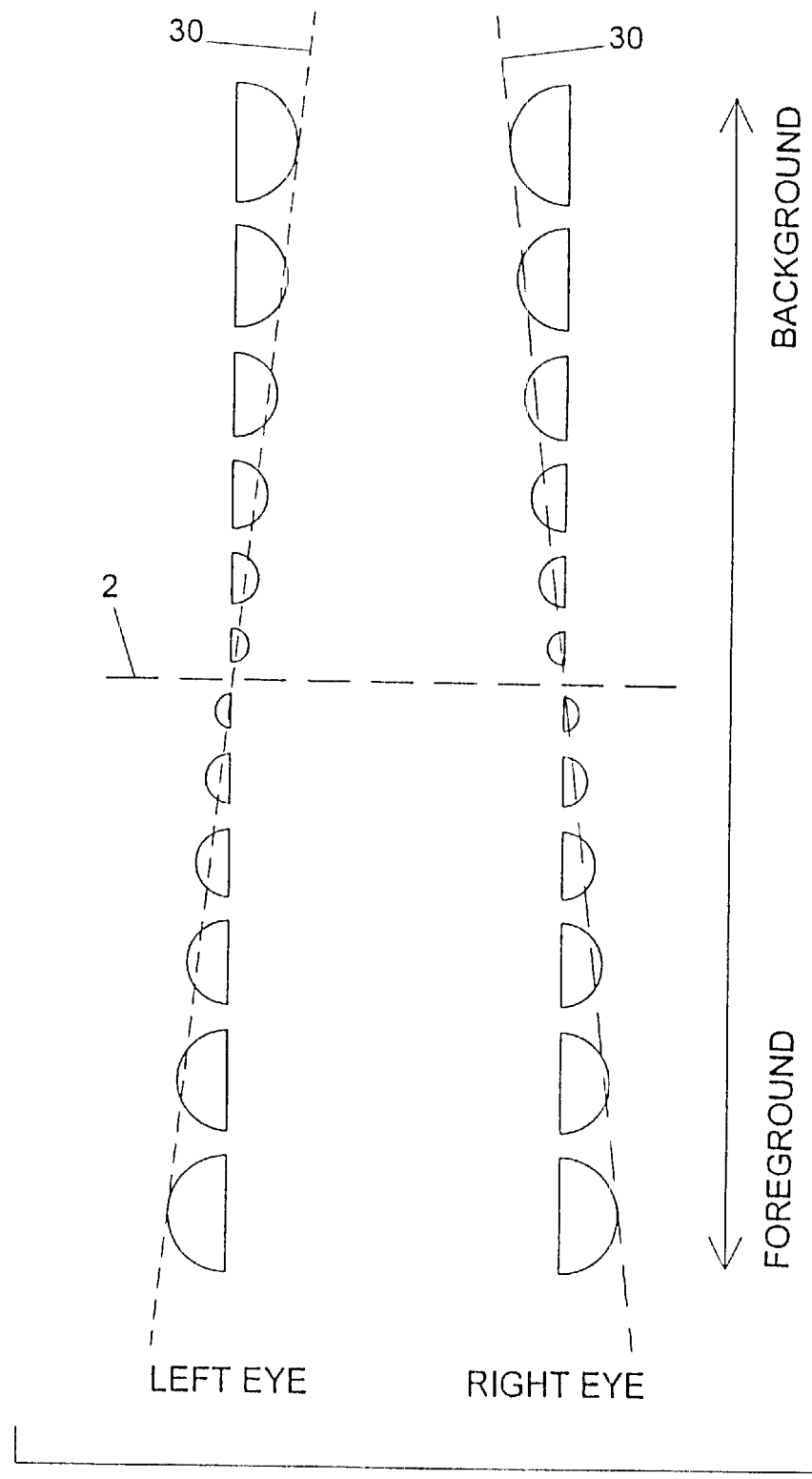
FIG. 15 shows the slope associated with the out-of-focus areas.

Another theory holds that the bilateral nature of this effect gives the brain the effect of a slope which suggests depth relationships. FIG. 15 shows how the sizes of the out-of-focus areas in the image plane vary as the subject points increase distance from the subject plane as indicated by the dashed line 2. Leftmost dashed line 30 shows the slope of those sizes as viewed from the left eye. Rightmost dashed line 30 shows the slope of those sizes as viewed from the right eye. The two slopes converge in the distance (the background) much as two perspective lines would converge. This theory implies that the two parts of the optical-encoding at the aperture stop must occupy the same width, but need not otherwise be symmetric, a supposition that has not yet been tested.

C. Competing Methods

The method of this embodiment differs markedly from the traditional understandings of how 3D effects are produced. The most common approach to producing 3D is by use of two lenses in a parallactic displacement arrangement. FIG. 16A shows this dual-lens approach. In it, the subject 31 is viewed independently by two lensing systems. The left view of the subject is captured by the leftmost lensing system 1 whereafter that view is projected onto the leftmost of two image planes 3. The right view of the subject is captured by the rightmost lensing system 1, whereafter that view is projected onto the rightmost of the two image planes 3. Each image plane holds a totally separate view of the object, one shifted left of center and the other shifted right of center.

Figure 16B:
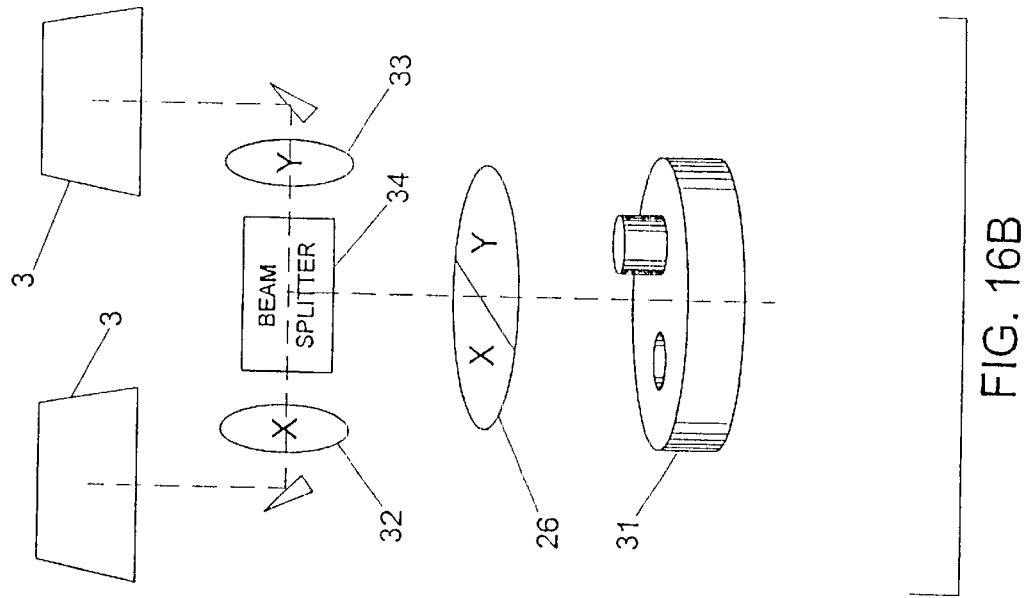
FIGS. 16A and 16B show the difference between dual-lens 3D and single-lens 3D and illustrates two advantages that single-lens 3D has over dual-lens 3D.
Figure 16A:
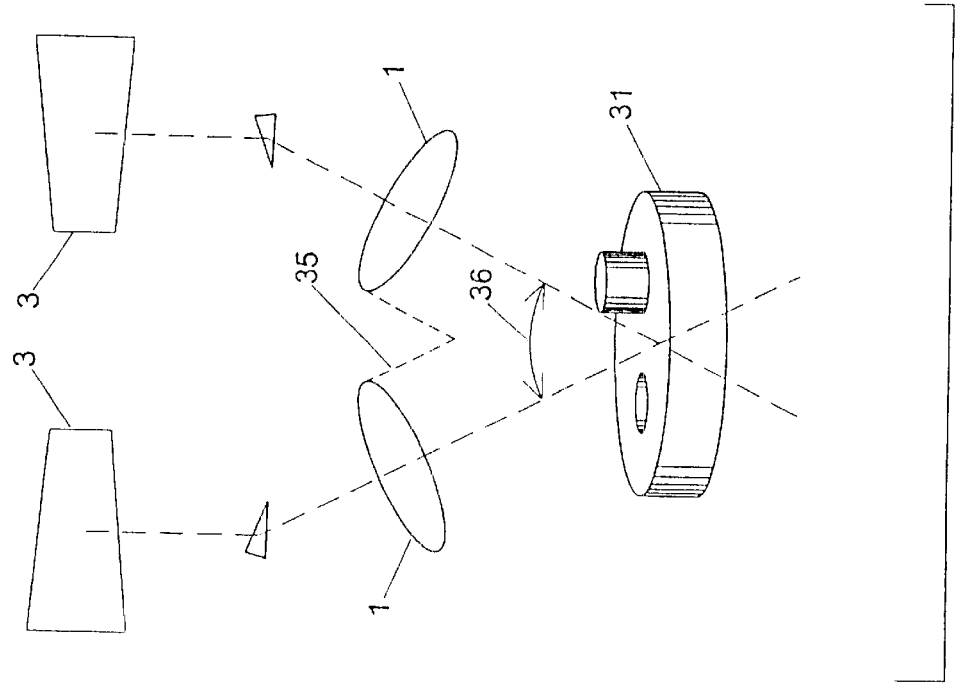

FIG. 16B shows this embodiment and teaching as disclosed herein. In it, the subject 31 is viewed by a single lens into the aperture stop of which has been inserted the optical-encoding filter 26. A beam splitter 34 causes identical images to be sent to the left and right. The filter 33 eliminates from the common image all circle of confusion information except that allowed to pass by filter side Y. The filter 32 eliminates from the common image all circle of confusion information except that allowed to pass by filter side X. Both side filters allow identical in-focus information to pass. The leftmost of the image planes 3 receives an image, the in-focus part of which is identical to the in-focus part of the image received by the rightmost of the image planes 3. The only information that differs between the two image planes is the circle of confusion (out of focus) information that carries the encoded depth or 3D information.

Visually, this single-lens 3D embodiment is very different from dual-lens 3D. Single-lens 3D suffers from no parallactic displacement. With dual-lens 3D, parallactic displacement 36 often leads to keystoning, double image distortions, cross talk and ambiguous border information. Also single-lens 3D retains a full core of information, whereas dual-lens 3D can miss critical core information, as at 35 (for example, cannot look down holes).

With dual-lens 3D images can appear in-focus in front of the image plane or behind it. When the human eye attempts to focus on an object that does not exist in actual space, eye strain and fatigue can ensue. With single-lens 3D no in-focus part of the image can ever exist out of the image plane. The human eye is naturally drawn to focus on the image plane where is should be focused.

Another competing method is the Schulman approach first disclosed in U.S. Pat. No. 2,225,631. Schulman noted that a stereovision effect could be achieved by lighting a subject from two sides. Arrangement is made is made so that one eye sees only the image lit from a corresponding side, and the other eye sees only the image lit from the other corresponding side. This effect can produce good stereoscopic views. When used in microscopes, the stereoscopic effect is reduced as magnification increases. At macro levels this method is difficult because of the complexity of deploying large displaced lights. Although Schulman uses a single lens, it nevertheless suffers from many of the flaws of dual-lens that lead to viewer discomfort, such as, causing the eye to focus outside the image plane, and distinctly different images being presented to each eye.

Other methods exist that are variations on these two other approaches.

D. The Invention

Figures 17A, 17B:
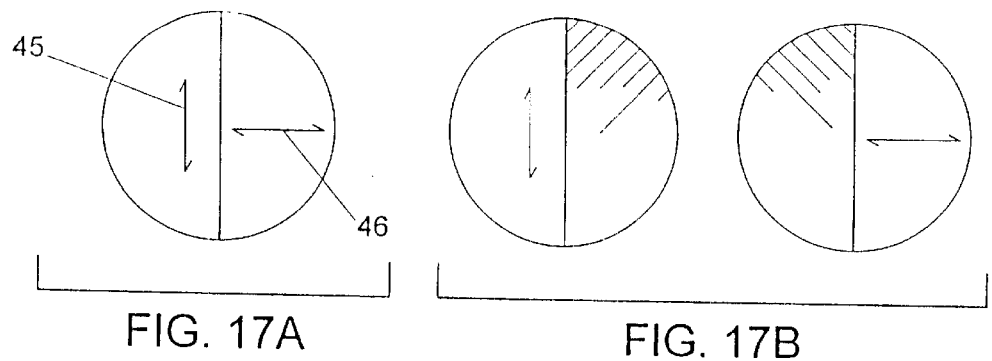
FIGS. 17A and 17B show the polarizing effect of the existing "light-valves."

Our implementations only require use of a passive element or manipulative means at the aperture stop of the lens system. This approach has several advantages over the other approaches. The typical stereoscopic "light-valve" is composed of two opposing linear polarizing filters as shown in FIG. 17A. The vertical orientation indicator 45 shows that the left side of the aperture stop is covered with polarizing material that polarizes in the vertical orientation. The horizontal orientation indicator 46 shows that the right side of the aperture stop is covered with polarizing material that polarizes in the horizontal orientation.

FIG. 17B shows a sequence of effects on the aperture stop caused by the common form of "light-valve" that is composed of two half FeroElectric Liquid Crystal (FLC or FELC) switches. Such switches operate each half alternately, one occluding and the other allowing light through, then the second occluding and the first allowing light through the first half. The light passing parts are typically oriented in opposing polarizing orientations.

When opposing sides of the aperture stop are orthogonally polarized, an interesting effect is imposed on the viewer of the resulting images. Sky, water, and other reflecting and polarizing effecting surfaces will appear different to each eye. Sky, for example, will appear very dark to one eye and will appear very light to the other eye. This can appear to strobe in video and film presentations, and lead to eyestrain when used with still image presentations.

Figure 18:
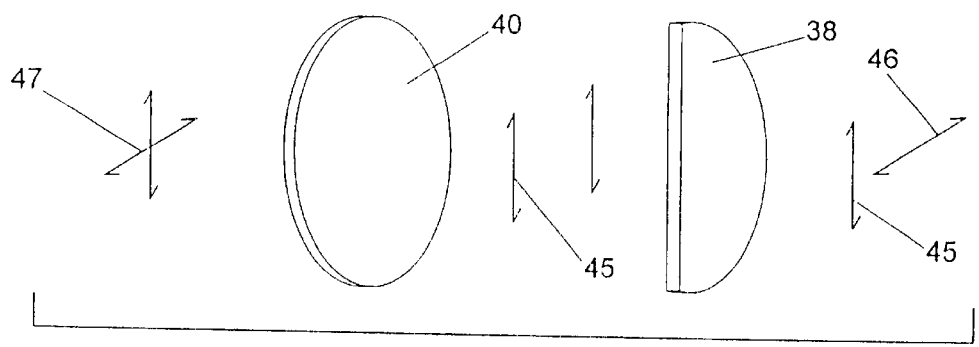
FIG. 18 shows our implementation with a passive component at the aperture stop.

Our implementations are quite different and produce a much more pleasing effect. As shown in FIG. 18, non-polarized light enters the light path at 47. A leading conditioner such as a linear polarizing filter 40 polarizes all light entering the system in the same orientation as shown by indicator 45. Whatever polarizing orientation outside subjects may have had, such as sky, will be polarized once and uniformly. If the sky is dark, for example, it will remain dark thereafter. A passive half-wave retarder 38 is placed at the aperture stop and cut so that it only occupies a portion such as one half of the aperture stop. A correctly oriented passive half-wave retarder will shift the polarizing orientation of the light passing through it by 90° and thus manipulate the image signal of that portion of the light. The result on the light path is a left side orientation that is vertical as at 45, and a right side that is horizontal as at 46. But note that the polarizing or conditioning effect on the sky was done once by the leading linear polarizing filter 40, and remains the effect thereafter. The change in one half the aperture by the passive half-wave retarder only effect the polarizing orientation of the light, not the image that is being passed through it. Our implementation can be used with sky, water, and other reflecting and polarizing altering materials with no conflict between what each eye sees. It does not strobe when used with video and movies, and produces no eyestrain.

Another advantage of our implementation is that we place a passive component at the aperture stop of the lens system. The passive half-wave retarder 38, once installed, requires no maintenance and no adjustment over time. Because it is passive, unlike existing commercial "light-valves," it is neither prone to failure nor prone to need for periodic replacement. That the passive half-wave retarder is placed at the aperture stop of the lens system is not intended to be limiting, however, as it is well known that lens systems may have multiple aperture stops, called the aperture stop and its conjugates. Such positionings of the aperture stop may nevertheless be employed in the invention and those skilled in the optic arts will readily be able to extend the present principle to any conjugate of the aperture stop.

Figures 19A, 19B, 19C:
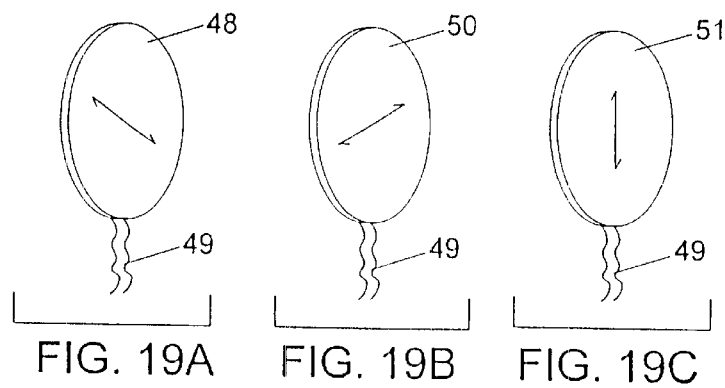
FIGS. 19A, 19B, and 19C show the three polarizing orientating effects produced by the electric switched quarter-wave retarder.

In addition to the passive element that is at the aperture stop, we also use a switched means to manipulate the light such as an electric switched quarter-wave retarder (optical switches, electro-optical polarization rotation material or magnetic switches are also possibilities) which can be anywhere in the light path between the leading and trailing linear polarizing filters, but which is generally not placed at the aperture stop. FIG. 19A shows an electric switched quarter-wave retarder 48 that is powered by wires 49. In its non-powered state its effect on polarizing orientation is neutral, rotating that orientation only 45°. This allows light to pass through both sides of the aperture. Unlike failure modes of earlier art, our system fails in a way that allows a full image to pass, but only loses 3D information. Such a failure mode is critical in such fields as medicine and other life-critical missions. FIG. 19B shows the effect when the electric switched quarter-wave retarder is powered one way 50. It rotates the polarization orientation of light to one polarizing orientation. When it is powered in the other direction, as at 51 in FIG. 19C, it rotates the polarization orientation of light to the other polarizing orientation.

Figure 20A:
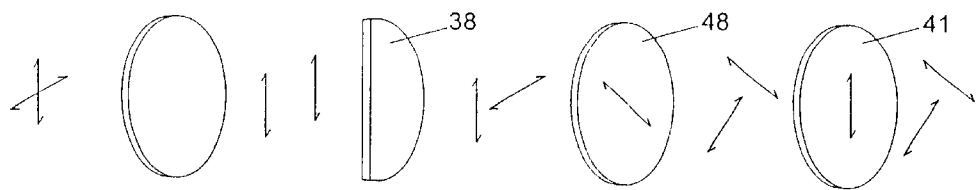
FIGS. 20A, 20B, and 20C show the output polarizing effects of the three polarizing orientating effects produced by the electric switched quarter-wave retarder.
Figure 20B:
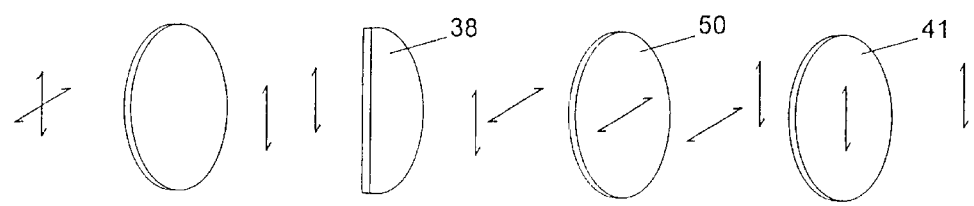
Figure 20C:
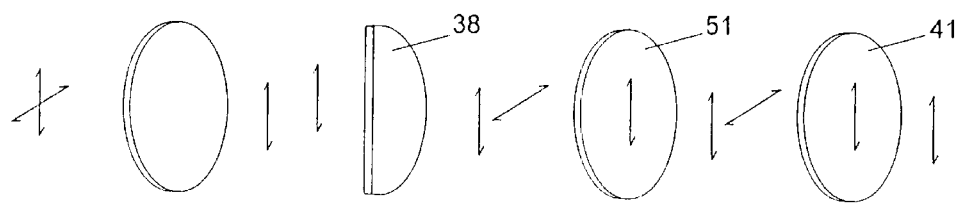

FIGS. 20A, 20B, and 20C show the effect of the three polarizing orientating directions of the electric switched quarter-wave retarder when combined with a trailing linear polarizing filter 41 (also called an analyzing polarizer). FIG. 20A shows that when the electric switched quarter-wave retarder is in its neutral orientation 48 the polarization orientation of the two halves of the aperture stop are rotated 45°, thus allowing both sides to pass through the trailing linear polarizing filter 41. FIG. 20B shows that when the electric switched quarter-wave retarder is powered into its counter clockwise direction 50, the polarization orientation of the two halves of the aperture stop are rotated 90° thus allowing only the light from the passive half-wave retarder 38 side of the aperture stop to pass through the trailing linear polarizing filter. FIG. 20C shows that when the electric switched quarter-wave retarder is powered into its clockwise direction 51, the polarization orientation of the two halves of the aperture stop are left in their original orientation, thus allowing only the light from the unoccupied side of the aperture stop to pass through the trailing linear polarizing filter.

Because only the passive half-wave retarder 38 needs to be in the aperture stop, the other components can be installed outside the lens system. Such an arrangement leaves a lens system that acts as thought it is unmodified unless combined with the other components. This arrangement has the advantage of allowing the creation of lenses that can be used for work other than 3D image production, a concern that many users will have when faced with a choice between single-use and multiple-use expensive lenses.

E. Common Considerations

Our implementations share several common elements that we describe in one place here for simplicity.

As shown in FIG. 21A, the bisecting edge 39 of the passive half-wave retarder 38 may be treated to minimize unwanted refractive visual noise. One implementation is to coat the bisecting edge with light-absorptive material, such as flat-black paint, dye, or a light absorptive agent. Another implementation, as shown in FIG. 21B, is to apply the passive half-wave retarder as a coating 52 to an optically flat transparent surface 53, such as glass. Another implementation, as shown in FIG. 21C, is to sandwich the passive half-wave retarder 38 along with transparent filler material 78 between two optically flat transparent surfaces 53, such as glass. FIG. 21D shows that the leading linear polarizing filter can be included in a sandwich with the components of FIG. 21C, where the leading linear polarizing filter must always precede the passive half-wave retarder in the light path. These implementations are not intended to be limiting, however, as it is well known that edge refractions can be eliminated using any of a wide variety of methods. Any such method may nevertheless be employed in the invention and those skilled in the optic arts will readily be able to extend this principle to any method for eliminating undesirable edge refraction.

An electric switched quarter-wave retarder is any of a class of switch manipulation means or devices that can change the orientation of linearly polarized light by 45° in one direction when electrically energized and that can change the orientation of linearly polarized light 45° in the opposite direction when electrically energized oppositely. In practice any electro-optical polarization rotation material is useable. One common implementation of an electric switched quarter-wave retarder is as part of a FeroElectric Liquid Crystal switch (FLC or FELC), a device that can alter the orientation of linearly polarized light by variable amounts in either direction under electric potential control. Use of an FLC or FELC switch is, however, not intended to be limiting, as it is well known that linearly polarized light can be reoriented or manipulated by 45° in alternating directions by many means, electric, optical, magnetic or mechanical. Any such implementation may nevertheless be employed in the invention and those skilled in the optic arts will readily be able to extend this principle to any method for reorienting linearly polarized light by 45° first in one, and then the opposite direction, under electric control. The specification of alternate 45° rotation is also not intended to be limiting because an electric switched quarter-wave retarder is variable in its rotation. Any degree of rotation that sums to a total polarization orientation change of 90° is acceptable, and any such alternate divisions of rotation are a part of this embodiment.

In FIG. 22, the orientation of the electric switched quarter-wave retarder 48 parallels that of the leading linear polarizing filter 40. The two parallel each other when the electric switched quarter-wave retarder is in one or the other of its electrically energized orientations but not both.

The polarization orientation of the passive half-wave retarder 38 parallels that of the polarization orientation of the leading linear polarizing filter 40. Current producers of passive half-wave retarder material mark the grain or neutral orientation of the material with an arrow or other indicator at the edge of the material. The material must be rotated 45° in either direction relative to its neutral orientation to bring its active polarization orientation into parallel alignment with the leading linear polarizing filter.

Figure 23:
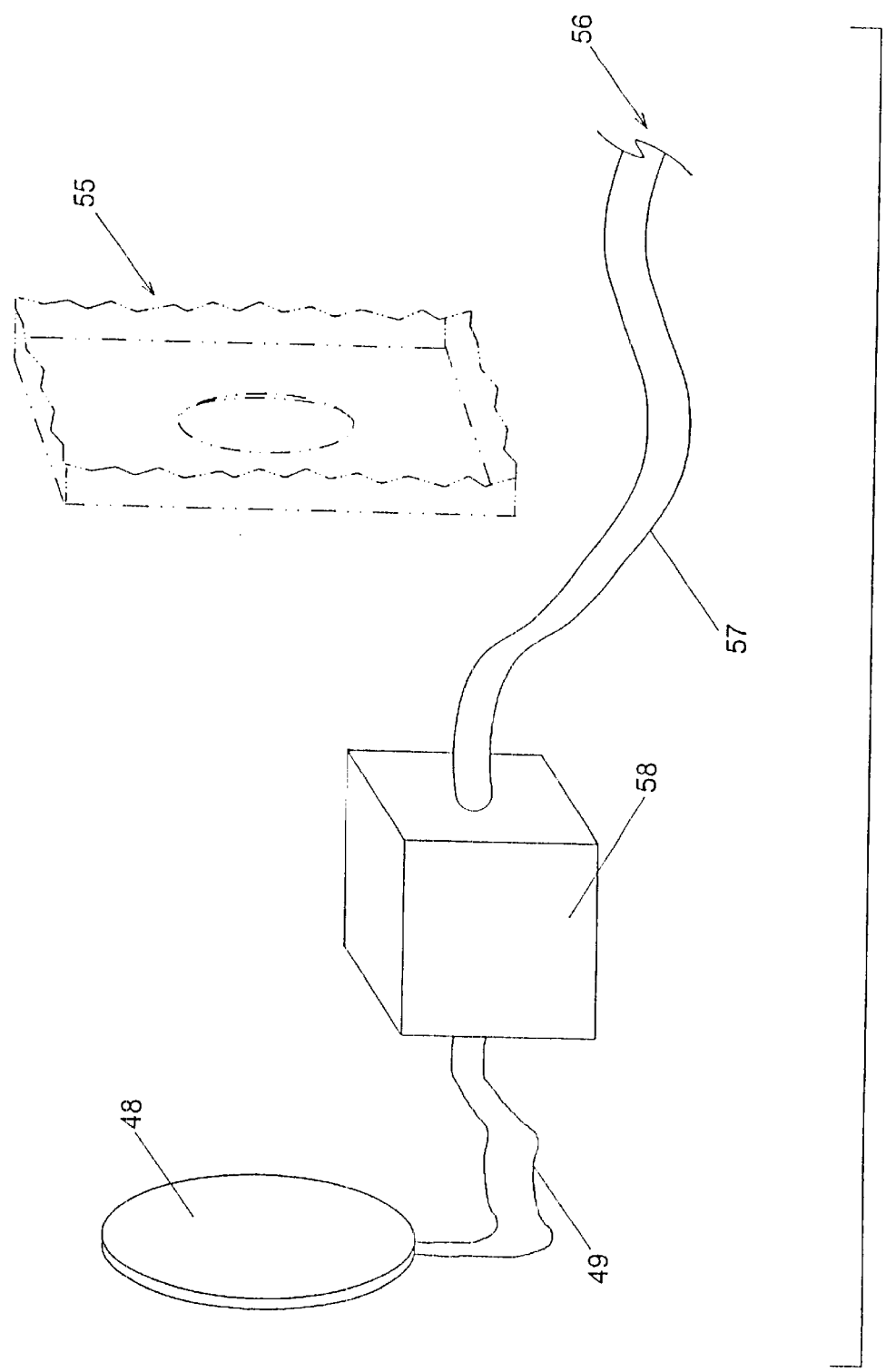
FIG. 23 shows a converter that converts a video signal to toggled energy for the electric switched quarter-wave retarder.

The electric switched quarter-wave retarder 48 is electrically energized to set it into one or the other of its polarizing effecting orientations. The electric switched quarter-wave retarder is provided its energy via the wires 49. The energy supplied to the electric switched quarter-wave retarder toggles it from one quarter wave orientation setting to the other and back again. As shown in FIG. 23, a signal originates at 56 inside the camera 55 and is passed to a converter box 58 over the wires 57. The converter box converts the internal signal produced by the camera into a form usable by the electric switched quarter-wave retarder. The converted signal is passed from the converter box 58 to the electric switched quarter-wave retarder 48 via wires 49. The converter can convert a standard analog or digital video signal into a square wave for use by the electric switched quarter-wave retarder. The conversion from analog or digital to a square wave is intended to be illustrative of the general principle and is not intended to be limiting. Any method to drive the electric switched quarter-wave retarder may nevertheless be employed in the invention, and those skilled in the electric arts will readily be able to extend the present principles to an appropriate conversion circuit.

F. Stereoscopic Microscope

The second embodiment is a microscope with a single objective lens that produces a stereoscopic image when viewed through two oculars. This embodiment is a significant improvement over Carter 1988, which required separate polarizing filters for each ocular and required the polarizing filters to be adjacent to the objective lens.

Figure 24:
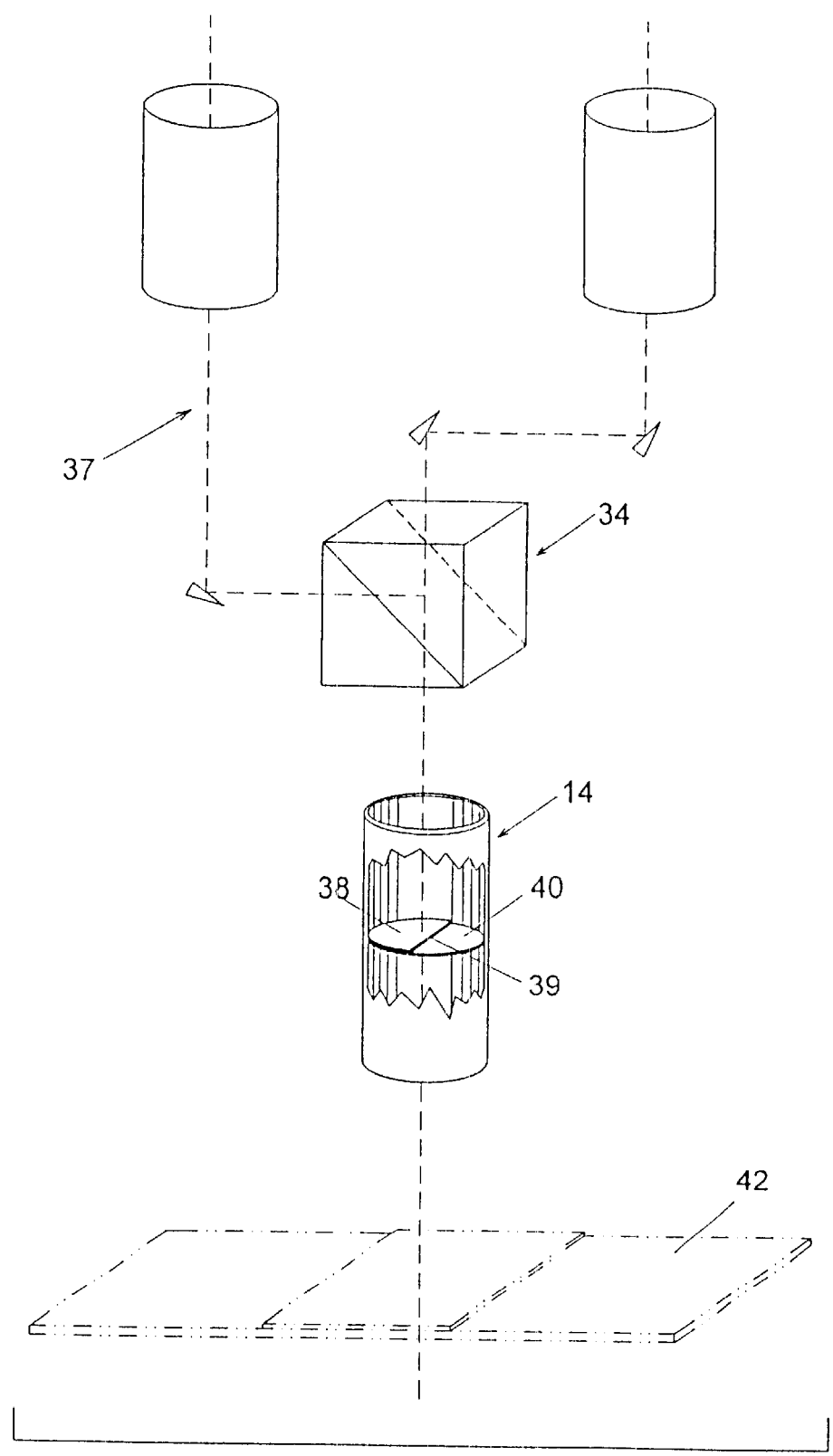
FIG. 24 shows the important components of a binocular microscope's optical path with a modified objective and a polarizing beam splitter as indicated.

In this embodiment, as shown in FIG. 24, the separate polarizing filters of Carter 1988 are replaced by a single polarizing beam splitter 34 in the binocular head of the microscope. The separate polarizing filters of Carter 1988 tended to be placed too near the image plane of each ocular, subjecting them to dirt and other contaminants which reduced the quality of the viewed image. Polarizing filters also tended to be placed on the oculars, thus preventing useful rotation of the oculars (as for focusing), and caused them to easily fall out of alignment. Use of a polarizing beam splitter significantly simplifies manufacture and eliminates the problems associated with the earlier system.

In this embodiment, the opposing polarizing filters adjacent to the objective (Carter 1988, as in FIG. 28) are replaced, in FIG. 24, with a passive half-wave retarder 38 at the aperture stop of the objective, and a single linear polarizing filter 40 anywhere in the light path prior to that passive half-wave retarder. With Carter 1988 the filter was placed adjacent to the objective. Practical experience showed that such a position only yielded acceptable stereopsis at powers of 10× and lower. By moving the filter to the aperture stop, or to any of the aperture stop's conjugates, all powers are made to produce good stereopsis.

The dashed line at 37 in FIG. 24 shows the vertical plane that divides the lens into two equal plane-symmetric halves. The passive half-wave retarder 38 covers one-half the area of the aperture stop with the bisecting edge 39 oriented perpendicular to plane 37 of the system. This orientation is not intended to be limiting, however, as it is well known that the ocular head can be rotated to accommodate different users, and the orientation of the passive half-wave retarder is rotated in such circumstances to align with the polarizing beam splitter, inside the rotated head.

Figure 25:
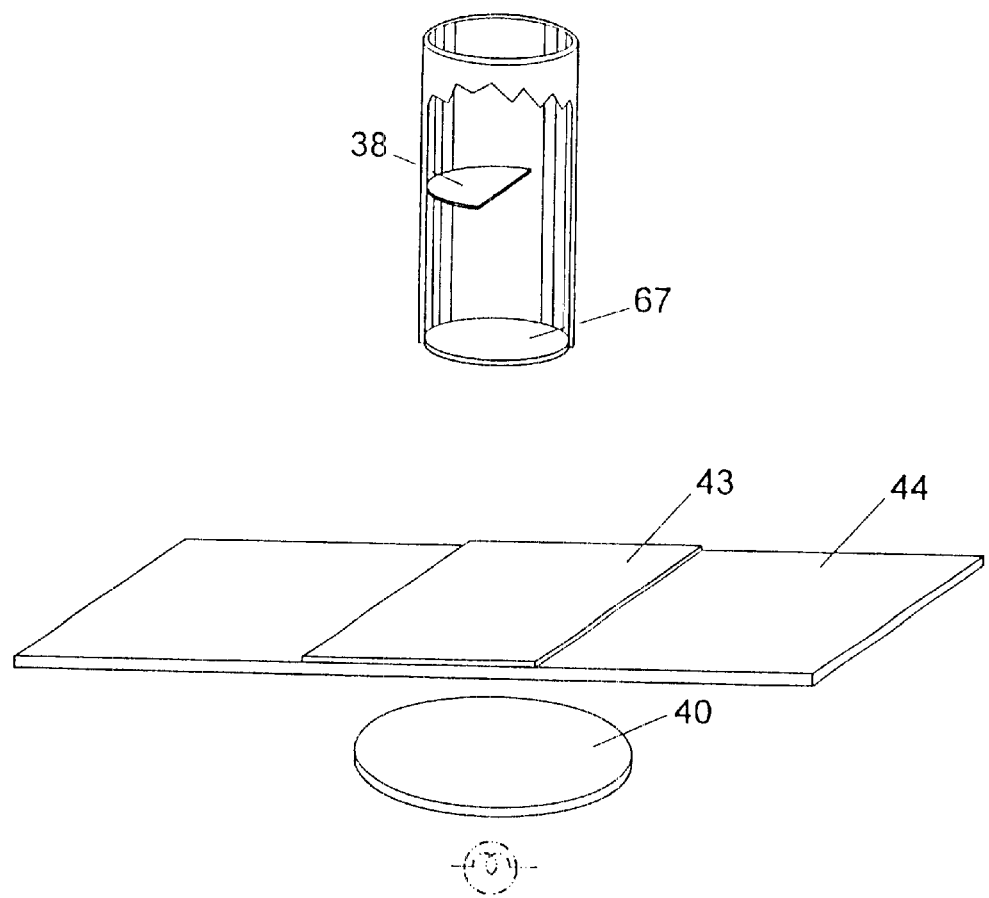
FIG. 25 shows alternate positions for the leading linear polarizing filter.

As shown in FIG. 24, a leading linear polarizing filter 40 is interposed between the subject, a specimen normally held between the slide parts 42, and the passive half-wave retarder 38. The ideal position is at the aperture stop, in the light path prior to, and immediately adjacent to, the passive half-wave retarder. Other positions are, as shown in FIG. 25, a coating on the front element of the lens system 67, or as a polarizing slide cover 43. When the leading linear polarizing filter is in the light path prior to the subject, the subject becomes back-lit as with a polarizing slide 44 or a polarized filtered illumination 40. Any position for the leading linear polarizing filter may be employed in the invention so long as the leading linear polarizing filter is in the light path prior to the passive half-wave retarder 38, and those skilled in the optic arts will readily be able to extend this principle to any acceptable position inside or outside of the lens system.

G. Stereoscopic Video Adapters For Microscopes

Figure 26:
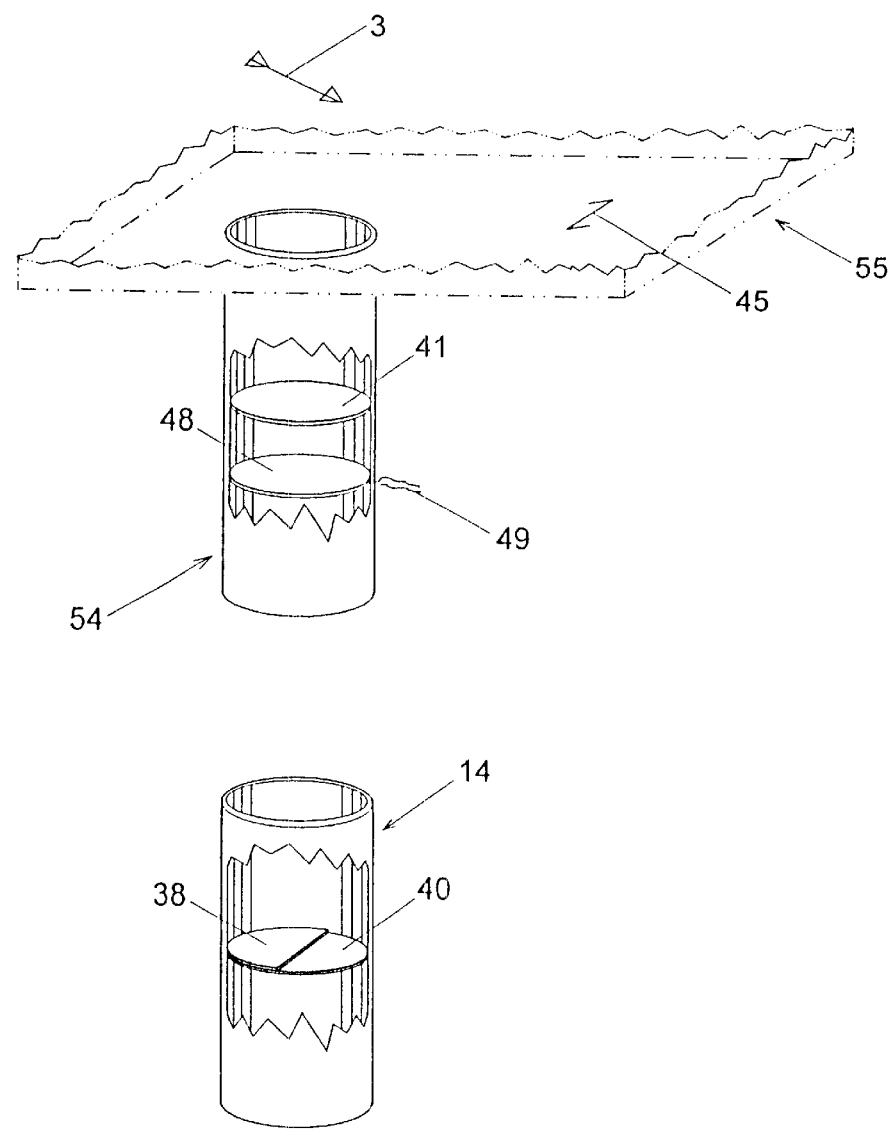
FIG. 26 shows a video camera adapter in conjunction with the use of a modified objective lens.

The third embodiment, as shown in FIG. 26, is a video adapter capable of producing a stereoscopic image when used in conjunction with, and subsequent in the light path to, a properly converted objective lens on a microscope. Included in this embodiment is an adapter that allows any video camera to produced a stereoscopic image in conjunction with any unconverted single objective microscope. The video camera is digital or analog.

In FIG. 4, the camera extension tube of a trinocular microscope is replaced with the video adapter 54. That the camera extension tube is replaced is not, however, intended to be limiting, because it is well known that images can be captured through the ocular holes as well. By scaling the video adapter down to the correct diameter, it can also be used to replace the ocular of a monocular or binocular microscope. In fact, as video cameras become smaller over time, the tendency will be to make the replacement of an ocular the preferred implementation.

The extension tube replacement 54 is normally threaded at its back with a C-mount (not shown in FIG. 26) so that any standard video camera body 55 can be attached to it. Normally still cameras mount with T-mount threads and video cameras with C-mount threads. Such threading is not, however intended to be limiting, because it is well known that cameras can mount in a wide variety of manners. Nikon and Canon, for example, have proprietary mounts that normally need to be adapted to a T-mount scheme. Any required mount may be nevertheless be used in the invention, and those skilled in the mechanical arts will be readily able to extend the present principle to the formulation of an appropriate mount.

The adapter tube 54 contains two optical elements, a final linear polarizing filter 41 (also called an analyzing polarizer), and an electric switched quarter-wave retarder 48. That these two elements are in the adapter tube is not, however, intended to be limiting. Either or both may equally well be placed inside the camera body 55, atop the objective 14, or in the objective 14. The preferred implementation is as part of the adapter tube because this implementation allows many different models and brands of video cameras to be used without the need to modify each. Nevertheless, one or both of the optical elements can be used inside the camera body and will still be considered part of this embodiment.

Figure 27:
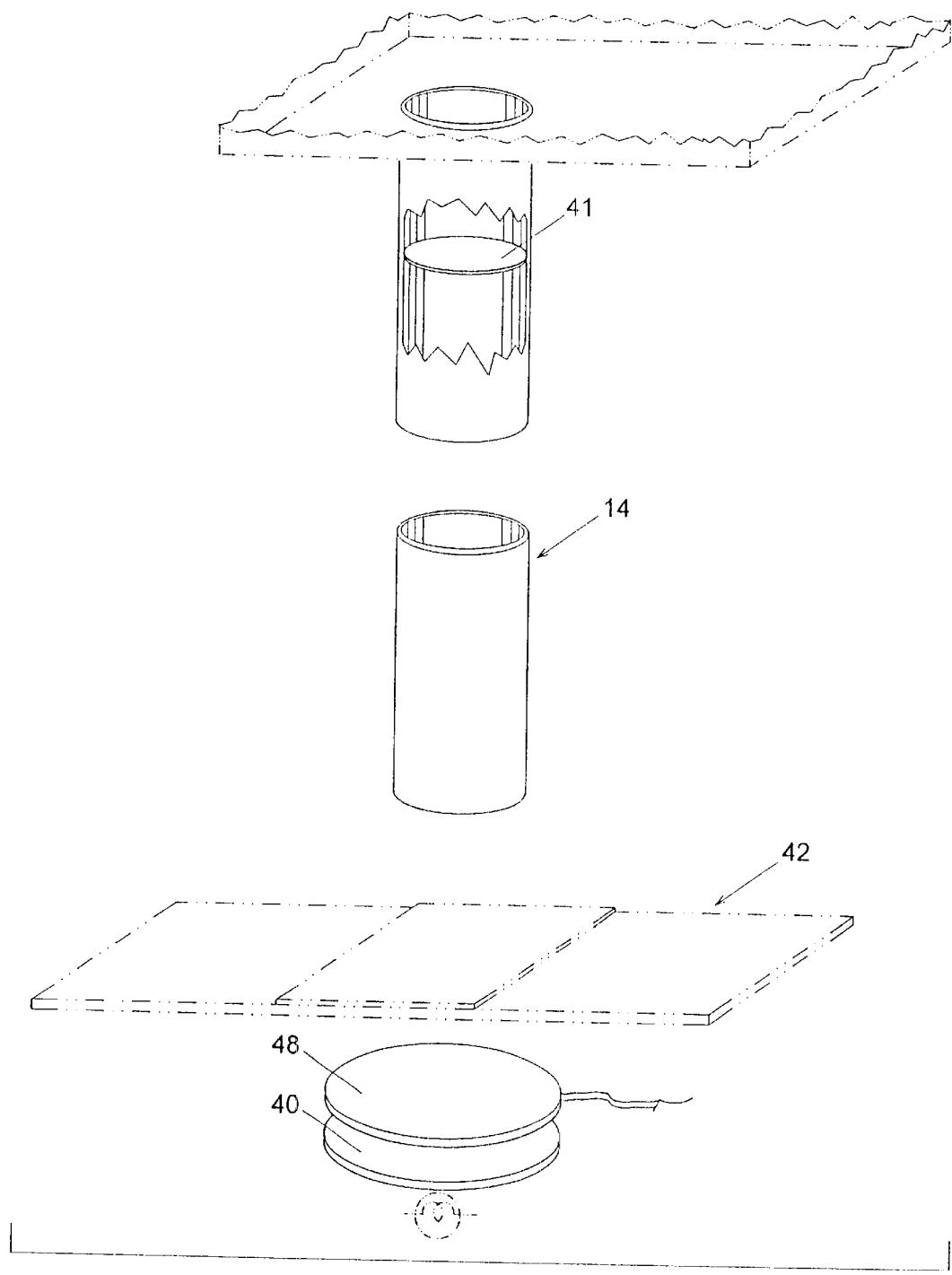
FIG. 27 shows a video camera adapter with alternative positions for the electric switched quarter-wave retarder.

As shown in FIG. 26, an electric switched quarter-wave retarder 48 is placed anywhere between the leading linear polarizing filter 40 and the final linear polarizing filter 41. Position 48 is the preferred implementation. In FIG. 27 we illustrate that the electric switched quarter-wave retarder will work equally well in the light path prior to the slide assembly 42 and in the light path subsequent to the leading linear polarizing filter 40, where the leading linear polarizing filter is itself in the light path prior to the slide assembly 42. The position of the electric switched quarter-wave retarder is irrespective of the position of the passive half-wave retarder (not shown in FIG. 27) inside the objective 14. As shown, the electric switched quarter-wave retarder 48 can be in the light path prior to the microscope slide 42 when the leading linear polarizing filter 40 is also in the light path prior to the microscope slide.

As shown in FIG. 26, the final linear polarizing filter 41 is placed anywhere in the light path between the passive half-wave retarder 38 and the image plane 3. The preferred implementation is inside the adapter tube 54 and in proximity to the electric switched quarter-wave retarder 48, because this placement allows the adapter to be used with a variety of video cameras. As mentioned, the final linear polarizing filter can also be located inside the camera body.

The final linear polarizing filter 41 has its polarization orientation oriented in parallel with the polarization orientation of the leading linear polarizing filter 40.

As shown in FIG. 26, the normal upright orientation of the camera, as indicated by 45, parallels that of the edge cut of the passive half-wave retarder 38.

Figure 28:
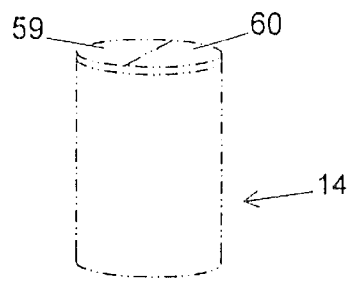
FIG. 28 shows the Carter 1988 method of modifying a microscope objective (prior art).

The adapter of FIG. 26 may also be used with an objective lens that has been modified with a modest variation on the Carter 1988 method. FIG. 28 shows such an objective lens 14. When the adapter is used with such a lens, the positioning rules are the same as if the left 59 and right 60 linear polarizing filters are viewed as a combined linear polarizing filter and passive half-wave retarder.

Figure 29:
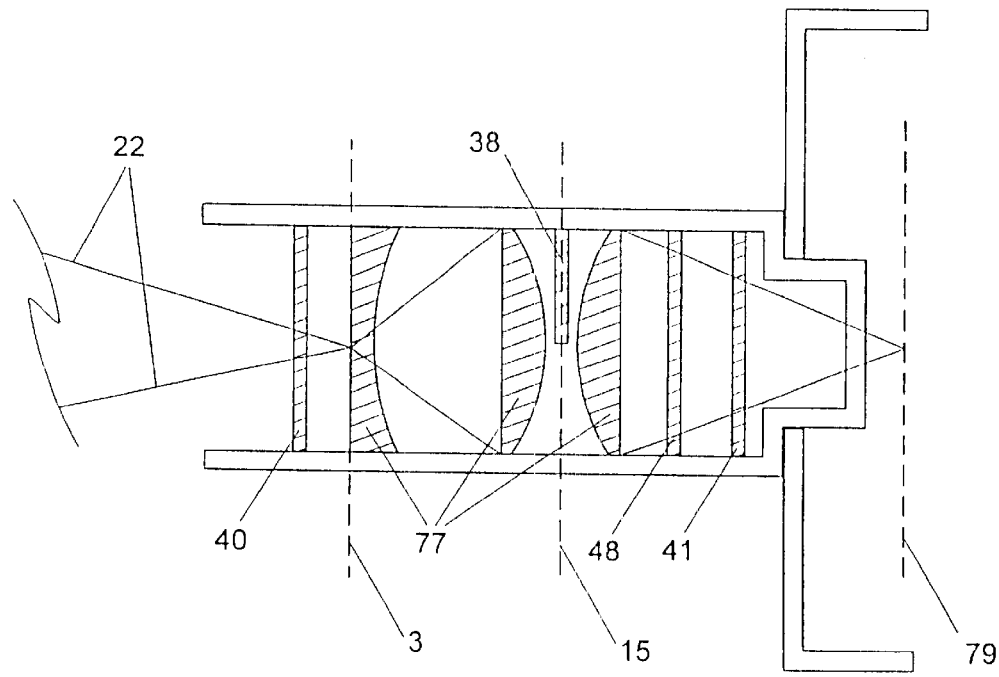
FIG. 29 shows the diagrammatic view of a video adapter that allows stereoscopic imaging with any unmodified microscope.

All the optical elements that combine to produce the stereoscopic stream can be combined into a single adapter. When they are so combined, the result is an adapter that will work with any unmodified non-3D microscope. FIG. 29 shows diagrammatically such a collapsing of elements into a single adapter.

As shown in FIG. 29, a relay lens system bracketed at 77 is required to produce a conjugate of the original aperture stop as indicated by the dashed line 15. The passive half-wave retarder 38 is placed at the created conjugate of the aperture stop. The relay lens system 77 takes the incoming image, the light path of which is indicated by 22 that originally focused on the image plane represented by the dashed line 3, and re-projects that image onto a new image plane represented by the dashed line 79.

The relay lens system, shown bracketed by 77, is depicted with simple lenses for the purpose of illustration. In actual practice, such relay lens systems are composed of compound lenses that are achromatic with spherical aberration corrections to produce a sharp and clear image. This depiction as simple lenses is not intended, however, to be limiting because it is well known that more complex lenses will produce a superior image. Any quality of lens may nevertheless be employed in this invention and those skilled in the optic arts will be readily able to employ lenses of any desired quality.

The leading linear polarizing filter 40 is located in the light path prior to the first element of the relay lens system bracketed by 77. This is the preferred implementation because the leading linear polarizing filter can then be used to protect the leading element of the relay lens system from visible contamination. As previously disclosed, however, the leading linear polarizing filter 40 may be located anywhere in the light path prior to the passive half-wave retarder 38.

The final linear polarizing filter 41 is located anywhere in the light path between the new image plane represented by the dashed line 79 and the passive half-wave retarder 38. The electric switched quarter-wave retarder is located anywhere in the light path between the leading linear polarizing filter 40 and the final linear polarizing filter 41.

H. Stereoscopic Producing Oculars and Ocular Adapters

The forth embodiment is a microscope ocular or ocular adapter constructed such that when two such oculars or ocular adapters are used in an ordinary binocular microscope head, and when the two oculars or ocular adapters are rotated 180 degrees relative to each other, they produce a true stereoscopic image of the magnified image. Such oculars and ocular adapters work on all lensing-objective microscopes equipped to accept at least two oculars and on any similar optical device.

That we specify microscopes should not be taken as limiting, however, as these adapters can be used with any optical instrument. Those skilled in the optic arts will readily see that these adapters can produce the desired effect when utilized with other instruments, such as telescopes, cloud chambers, endoscopes, surveying equipment, etc. Clearly use of these adapters with any other optical instrument shall be a part of this invention.

Figure 30:
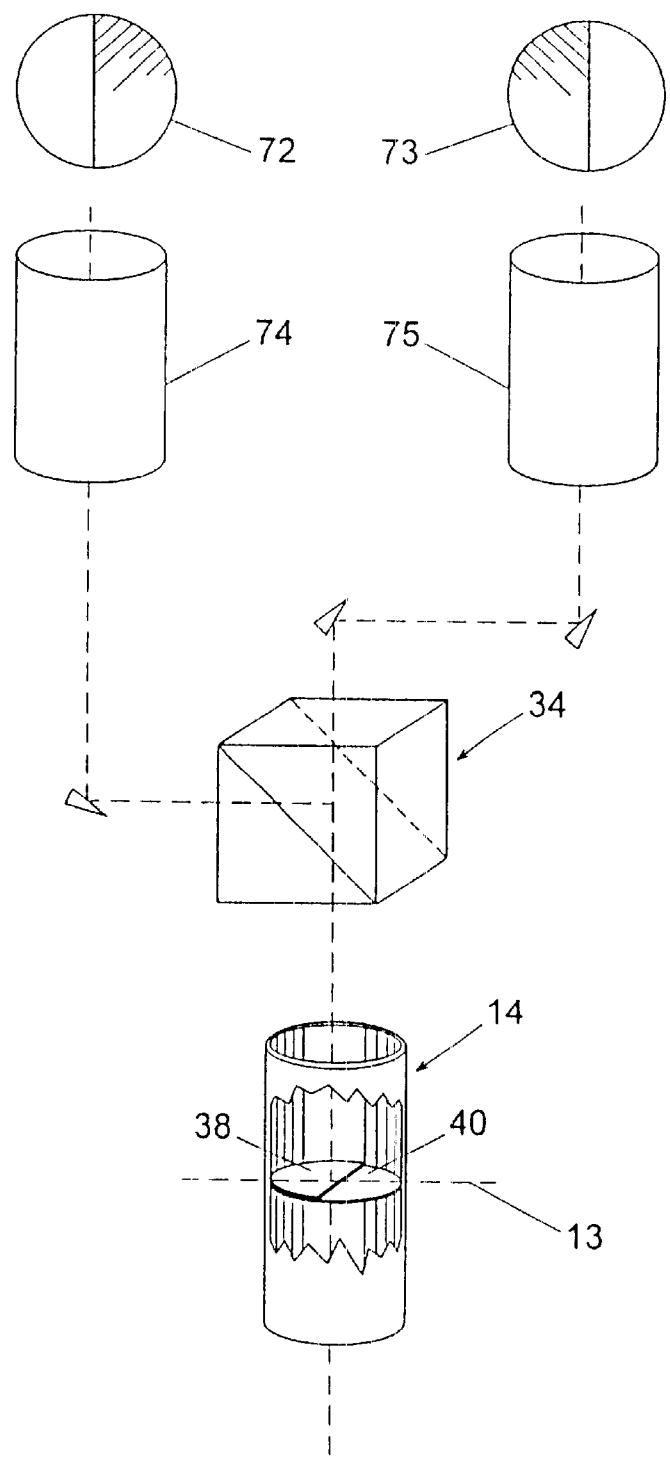
FIG. 30 shows the result of the second embodiment.

FIG. 30 shows how the single objective microscope of the second embodiment works. The passive half-wave retarder 38 at the aperture stop 13 of the lens system 14, when combined with the leading linear polarizing filter 41, causes the two halves of the aperture stop to orient the polarization of each half orthogonally to the other half. The polarizing beam splitter passes light of one polarization orientation to the left ocular 74 and light of the opposite polarization orientation to the right ocular 75. The diagram 72 shows how light passes through the aperture stop is perceived by ocular 74. The diagram 73 shows how light passes through the aperture stop is perceived by ocular 75.

Figure 31:
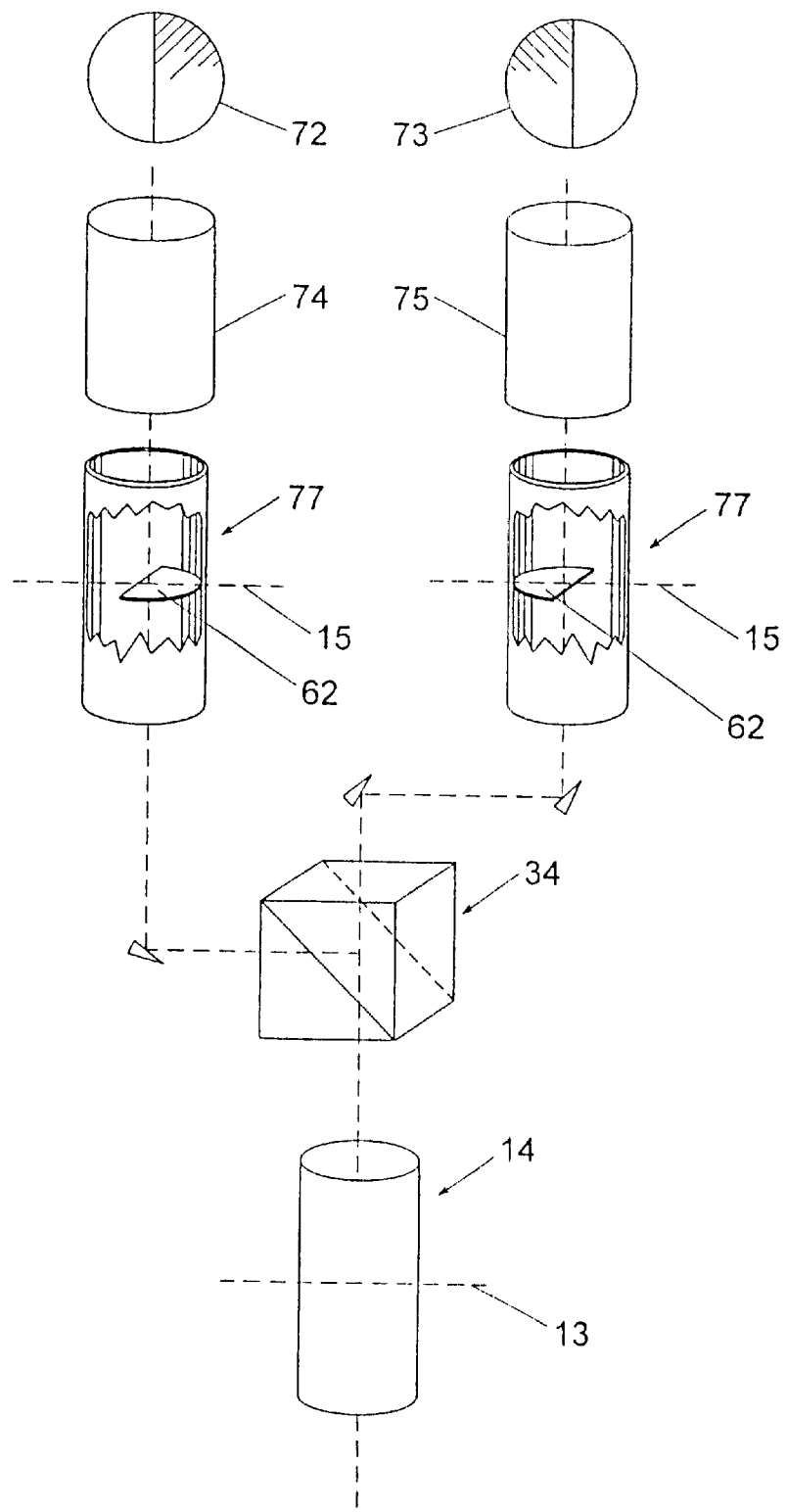
FIG. 31 shows how half occluded relay lens systems in front of the oculars of a binocular microscope can achieve the same effect as FIG. 30.

Viewed stereopsis is caused by the perceived effect of the aperture stop's optical-encoding differing between the right and left oculars. The perceived effect of the aperture stop's optical-encoding is key FIG. 31 shows a non-3D binocular microscope. An unmodified objective 14 and an unmodified beam splitter 34 cause identical images to be perceived by the two oculars 74 and 75. A relay lens system 77 is interposed in the light path prior to each ocular. Recall that a relay lens system 77 can create a conjugate 15 of the original aperture stop 13. By placing an optical-encoding filter 62 in each relay lens system 77, and by arranging for those optical-encoding filters to be orthogonally opposed, identical perceived effects, 72 and 73, of the aperture stop's conjugate 15 are produced as were the effects of FIG. 30 described above.

Figure 32:
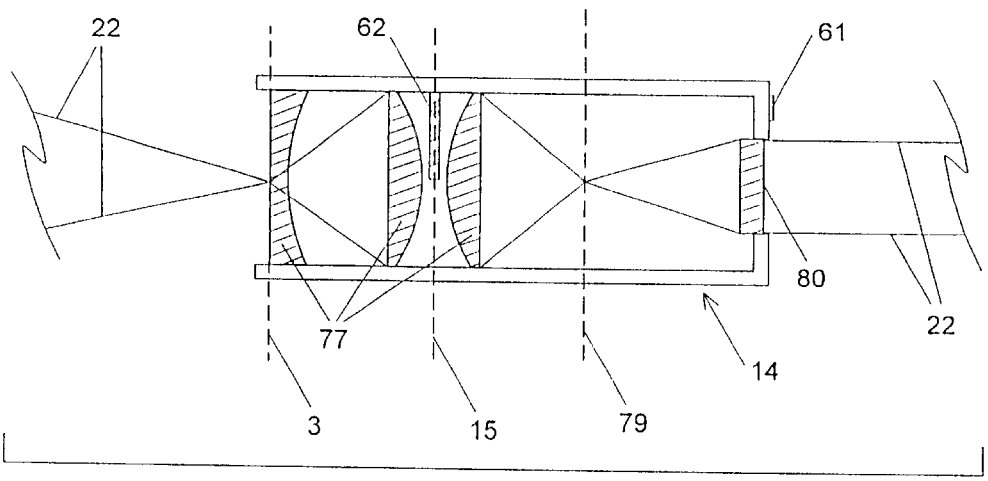
FIG. 32 shows the diagrammatic view of an ocular, pairs of which allow any microscope to produce stereoscopic images.

FIG. 32 shows diagrammatically one such implementation of a lensing arrangement for such a stereoscopic imaging ocular 14. A relay-lens system bracketed by 77 captures the image plane represented by the dashed line 3 produced by the microscope objective lens projection represented by lines 22. The relay-lens system relays the original image plane represented by the dashed line 3 to a new image plane represented by the dashed line 79. The new image plane represented by the dashed line 79 is viewed as an aerial image represented by 22, that is created by ordinary ocular optics suggested by 80. Alignment is via a marker, one example of which is shown at 61 or by mechanically coupling pairs together (not shown).

Figure 33:
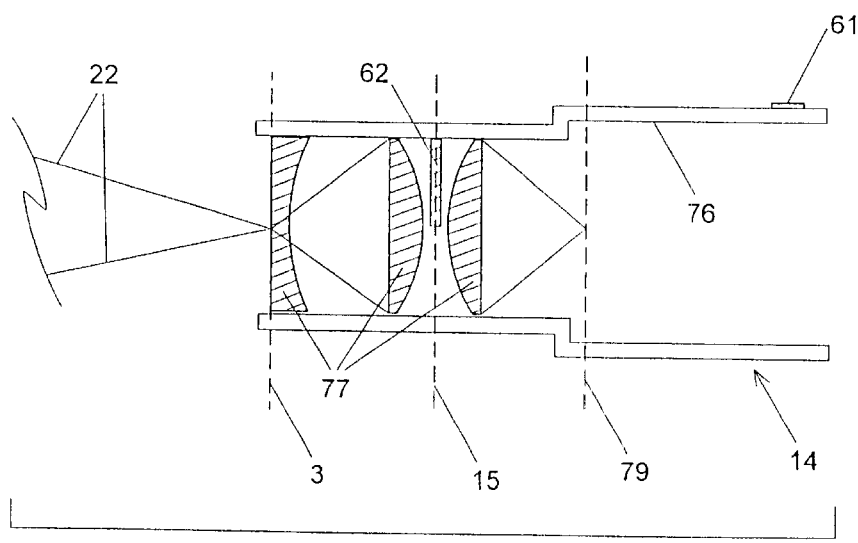
FIG. 33 shows the diagrammatic view of an adapter, pairs of which allow any ocular to produce stereoscopic images on any microscope.

FIG. 33 shows diagrammatically one implementation of a lensing arrangement for such a stereoscopic imaging ocular adapter 14. A relay-lens system bracketed by 77 captures the image plane represented by the dashed line 3 produced by the microscope objective lens projection represented by lines 22. The relay-lens system relays the original image plane represented by the dashed line 3 to a new image plane represented by the dashed line 79. The adapter is equipped with a sleeve 76 that allows any standard microscope ocular to be inserted when the diameter is the same specification.

The relay lens system shown bracketed by 77 is depicted with simple lenses for the purpose of illustration. In actual practice, such relay lens systems are composed of compound lenses that are achromatic with spherical aberration correction to produce a sharp and clear image. This depiction as simple lenses is not intended, however, to be limiting because it is well known that more complex lenses will produce a superior image. Any quality of lens may nevertheless be employed in this invention and those skilled in the optic arts will be readily able to employ lenses of any desired quality.

A neutral-density filter 62 placed at the created conjugate of the aperture stop 15 of the relay-lens system 77.

Figure 34:
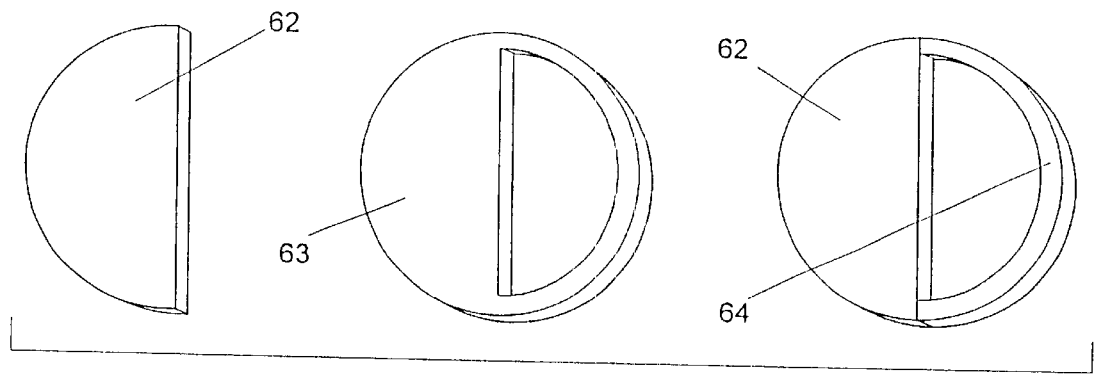
FIG. 34 shows variations on the shape of the neutral density filter and holes that are used to occlude the ocular and the ocular adapter.

FIG. 34 shows the shape of the neutral-density filter 62 that is placed at the aperture stop in the ocular or ocular adapter. The neutral-density filter is shaped to effect the transmission of light through one half the aperture stop. That it effects half the aperture stop is not, however, intended to be limiting. Occluding half the aperture stop has the effect of reducing the light through that aperture stop by 50%. Any effect of more or less of a 50% occluding may nevertheless be employed in this invention and those skilled in the optic arts will be readily able to extend this principle to change the shape of the edge or cut to reduce or increase the amount of light transmission through the aperture stop by any desirable percentage. Such modifications of the cut or edge include moving its position to create an occlusion of greater or less than one-half a circle.

FIG. 34 also shows that the neutral-density filter may equally well be constructed as a hole cut through a circular plate 63. Although we show a semicircular cut, any shape hole may nevertheless be used. FIG. 34 also shows that such a plate is also constructed from a cut half-disk 62 coupled with a half washer 64.

Figure 35:
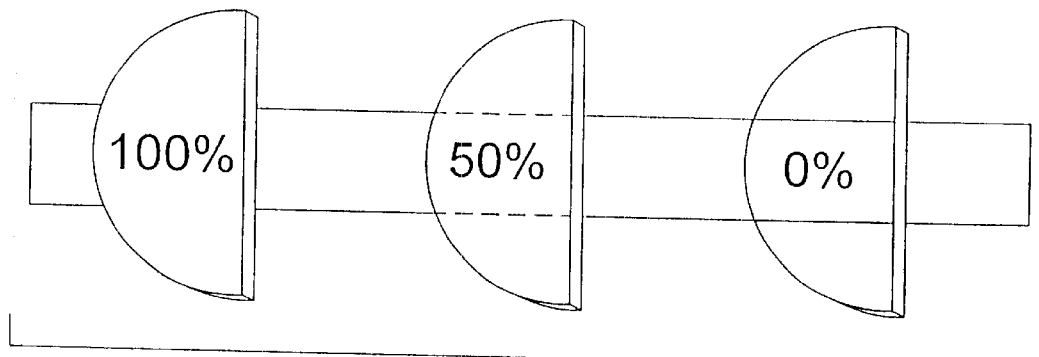
FIG. 35 shows variations on the transmission density of the neutral density filter used to occlude the ocular and ocular adapter.

FIG. 35 shows that the preferred implementation of a neutral density filter is to occlude the aperture stop at 100%. When the neutral density filter occupies half the aperture stop, a 100% blockage reduces the light transmitted through the entire aperture stop by 50%. Some applications may require less of a light loss. When the neutral density filter occupies half the aperture stop, a 50% reduction of light through the neutral density filter reduces the light transmitted through the entire aperture stop by 25%. When the neutral density filter occupies half the aperture stop and reduces light by 0%, it reduces the light transmitted through the entire aperture stop by 0%. A 0% occlusion eliminates the stereoscopic effect and is not recommended. That we illustrate three percentages of occlusion in FIG. 35 is not, however, intended to be limiting. Any percentage of occlusion may nevertheless be employed in this invention and those skilled in the optic arts will be readily be able to employ a neutral density filter of any percentage of occlusion.

Figures 36A, 36B:
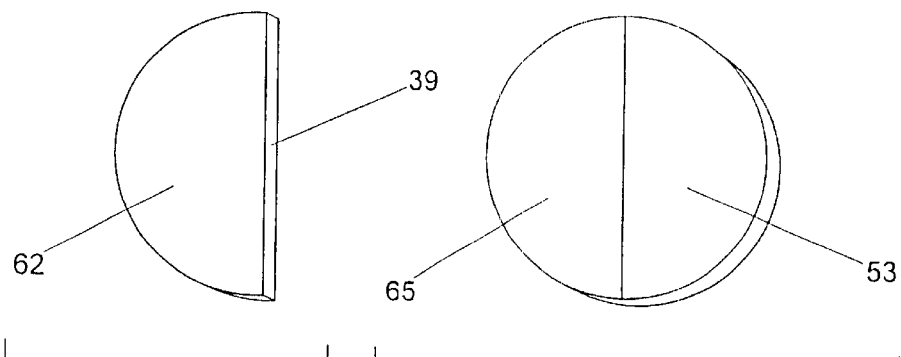
FIGS. 36A and 36B show treatment of the refracting edge of the neutral density filter used in the ocular and ocular adapter.

FIG. 36A shows the edge or cut 39 of the neutral-density filter 62. That edge or cut may be treated to minimize unwanted refractive visual noise. One implementation is to coat the edge or cut with light-absorptive material, such as flat-black paint, dye, or other light absorptive agents. Another implementation, as shown in FIG. 36B, is to apply the neutral-density filter as a coating 65 to an optically flat transparent surface 53, such as glass. These implementations are not intended to be limiting, however, as it is well known that edge refractions can be eliminated using a wide variety of methods. Any such method may nevertheless be employed in the invention and those skilled in the optic arts will readily be able to extend this principle to any method for eliminating undesirable edge refraction.

That we specify a neutral density filter should not, however, be taken as limiting because any form of filter can be configured to produce the desired effect. Those skilled in the optic arts will recognize that light can be altered with colored filters, wave-form modifying filters, and with polarization filters, and any such use of other filtering materials or techniques shall still be a part of this invention.

I. A Stereoscopic Video Lens

Figure 37:
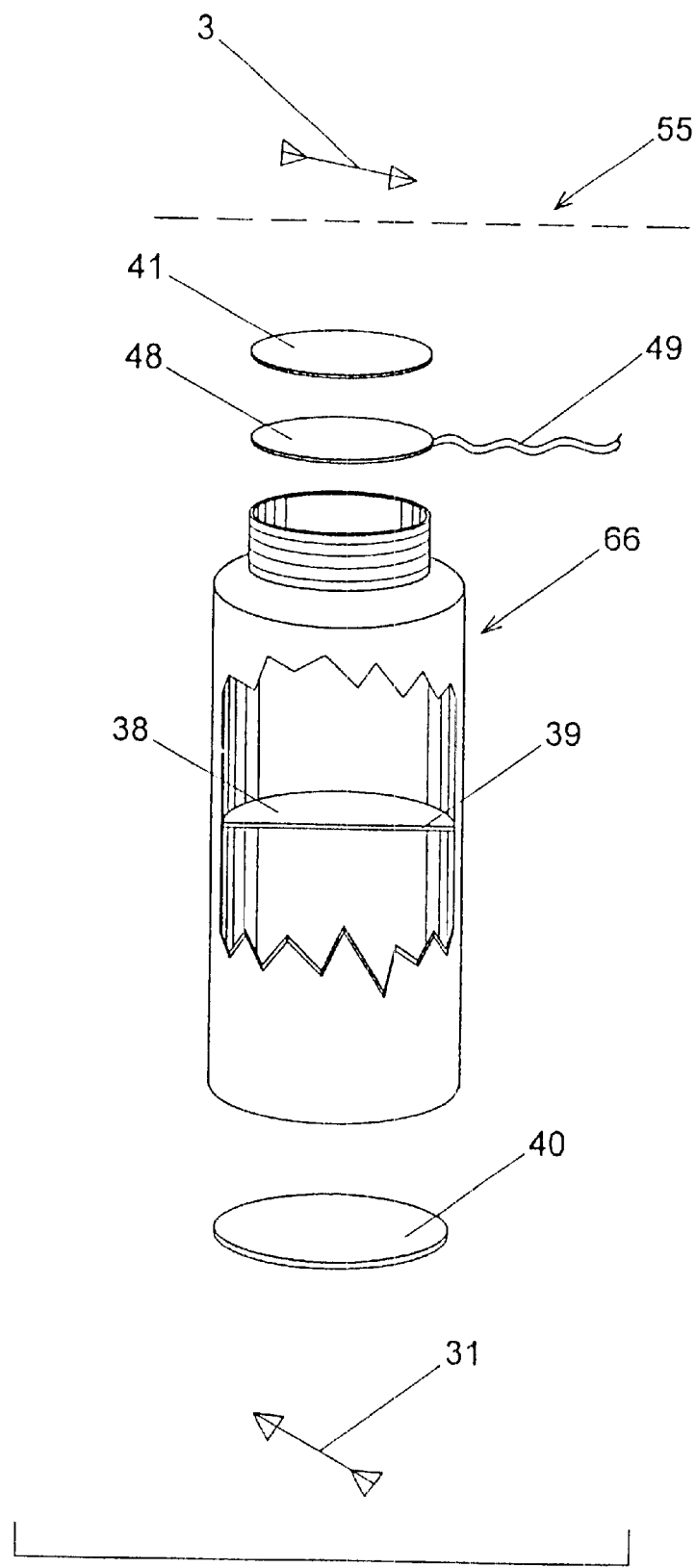
FIG. 37 shows a video lens capable of producing a sequence of stereoscopic pairs of images.

The fifth embodiment, as shown in FIG. 37, is a video lens system capable of imaging an subject 31, optical-encoding the subject's depth information with a leading linear polarizing filter 40, a passive half-wave retarder 38 at the aperture stop of the lens, an electric switched quarter-wave retarder 48, and a final linear polarizing filter 41, and recording that image on the image plane 3. The image plane 3 of video camera, the body of which is represented by dashed line 55, is the front surface of an Image Orthicon tube, a CCD array, or any other image recording surface. The camera is analog or digital.

The video lens system is capable of producing a sequence of images that can later be viewed in 3D, also called stereovision or human stereopsis. FIG. 37 illustrates such a lens system. Any of many common forms of video lenses are represented by the cylinder pictured at 66. Although FIG. 37 shows a fixed focal length lens, this assumption is not intended to be limiting, however, because it is well known that lenses can be constructed to vary their focal length, such lenses commonly being referred to as "zoom" lenses. Such variable focal length lenses may nevertheless be employed in the invention and those skilled in the optic arts will readily be able to extend the present principles to variable focal length lenses.

Figure 38:
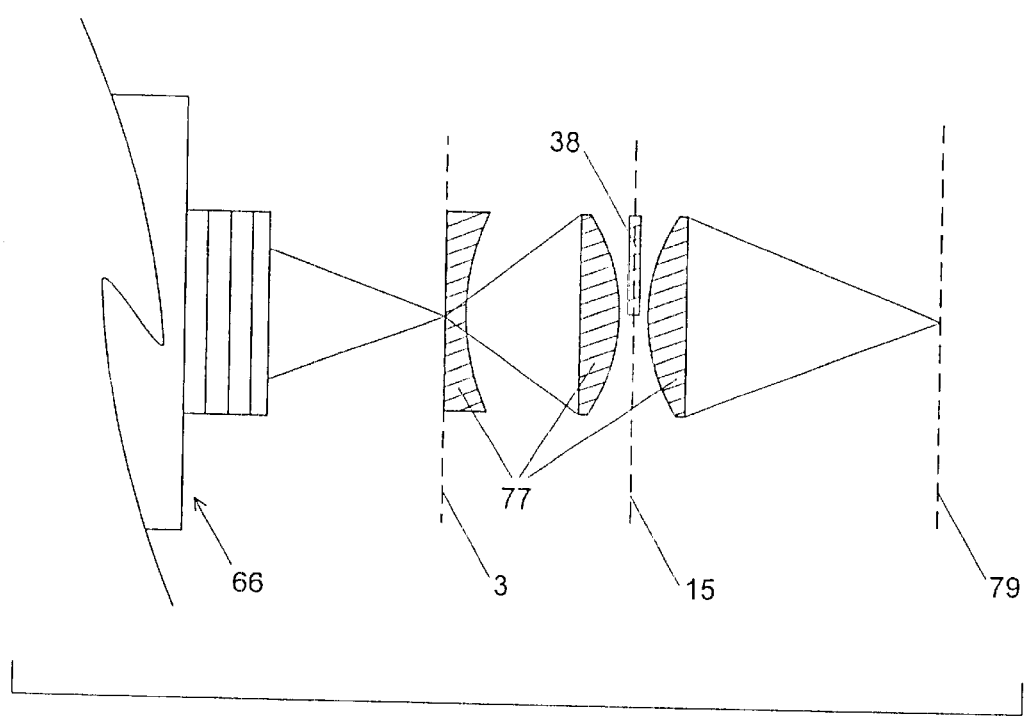
FIG. 38 shows an aperture stop that is outside the video lens system.

A passive half-wave retarder 38 is placed at the aperture stop of the lens system 66. This assumption is not intended to be limiting, however, as it is well known that lens systems may have multiple effective aperture stops, called the aperture stop and its conjugates. Such positionings of the aperture stop may nevertheless be employed in the invention and those skilled in the optic arts will readily be able to extend the present principle to any conjugate of the aperture stop. The assumption that the aperture stop is interior to the lens system is also not intended to be limiting, however, because it is well known that new conjugates of the aperture stop can be constructed in the light path prior to and/or in the light path subsequent to the an existing lens system. FIG. 38 shows one example of a new conjugate of an aperture stop created in the light path subsequent to an existing lens system 66. A typical relay lens system, shown bracketed by 77, gathers the image at the original image plane represented by the dashed line 3, and focuses a new image on a new image plane represented by the dashed line 79. Between the old and new image planes a new aperture stop—the position of which is indicated by the dashed line 15 (a conjugate of the original aperture stop) is created and the passive half-wave retarder 38 placed at that point. Such new conjugates of aperture stops, whether in the light path prior to or in the light path subsequent to the lens system, may nevertheless be employed in the invention and those skilled in the optic arts will be readily able to extend the present principle to placement of the passive half-wave retarder in any such created external conjugate of the aperture stop.

FIG. 37 shows that the passive half-wave retarder 38 covers one-half the area of the aperture stop with the bisecting edge 39 oriented vertically or near vertically. The vertical orientation is relative to normal upright orientation of the camera body, represented by the dashed line 55, to which the lens system 66 is attached. This orientation is not intended to be limiting, however, as it is well known that some lens systems rotate during use. For lens systems that rotate, the passive half-wave retarder 38 either attaches to a non-rotating component at the aperture stop, or is installed with hardware able to maintain the vertical orientation of its edge while the lens system rotates, or is placed in a new external aperture stop that does not rotate with the lens system. Such positioning or hardware modifications may nevertheless be employed in the invention and those skilled in the optic arts will readily be able to extend the present principles to any position or modification required to maintain a vertical orientation of the bisecting edge of the passive half-wave retarder in a rotating lens system.

The polarization orientation of the passive half-wave retarder 38 parallels that of the polarization orientation of the leading linear polarizing filter 40. When the leading linear polarizing filter 40 is external to the lens system, it adjusts to bring its polarization orientation into parallel with the passive half-wave retarder's polarization orientation. When both are external, one or the other or both adjust. When both are internal to the lens system, both are fixed in the correct orientation relative to each other during manufacture.

Figure 39A:
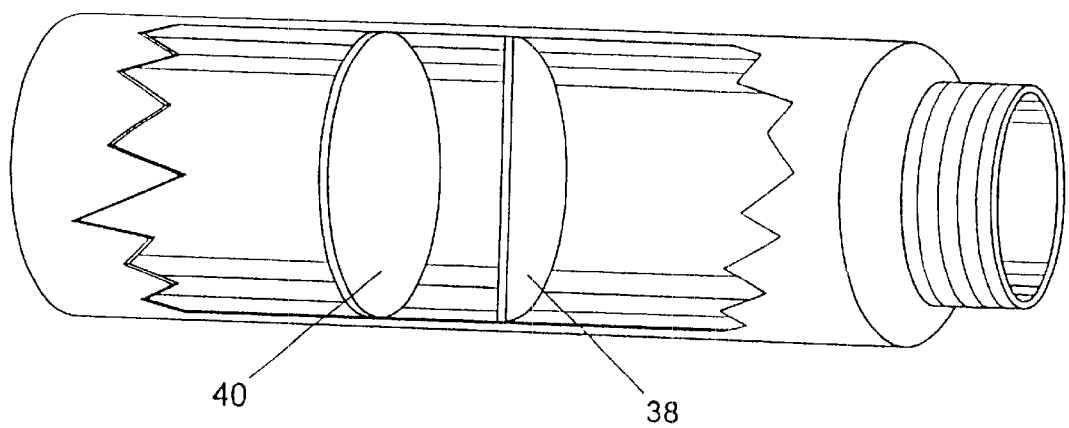
FIGS. 39A and 39B show alternative positions for the leading linear polarizing filter.
Figure 39B:
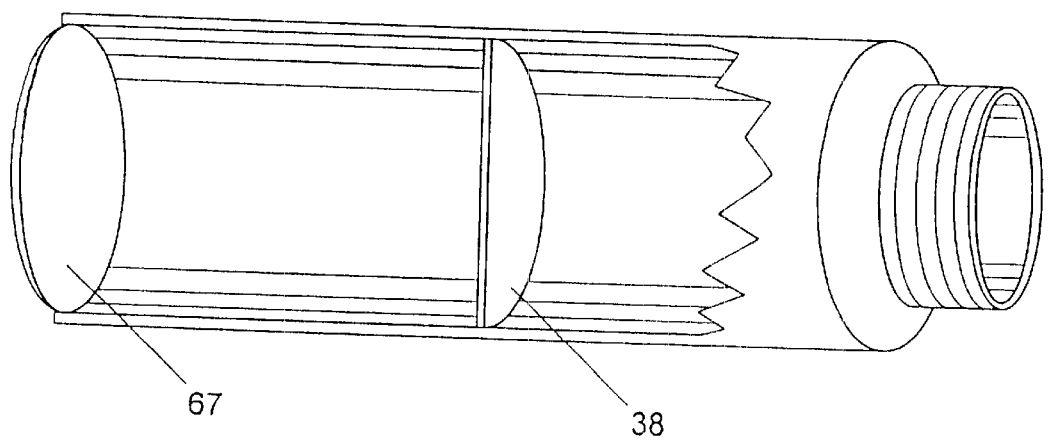

As shown in FIG. 37, a leading linear polarizing filter 40 is interposed anywhere in the light path between the subject 31 and the passive half-wave retarder 38. The ideal position is external to the lens system and optionally attached to the front of the lens system, as for example with a screw-on filter. Other positions are anywhere inside the lens system, FIG. 39A at 40, or as a coating on the front element of the lens system as shown in FIG. 39B at 67, that is, anywhere in the light path prior to the passive half-wave retarder 38 in both figures.

The external position 40 of FIG. 37 is preferred because it requires minimal modification of the lens. That position is not intended to be limiting, however, as it is well known that linear polarizing filters can be applied as coatings to lenses and can be positioned almost anywhere inside a lens system. Any position for the linear polarizing filter may be employed in the invention so long as it is anywhere in the light path between the subject and the passive half-wave retarder, and those skilled in the optic arts will readily be able to extend this principle to any acceptable position inside or outside of the lens system.

Figure 40A:
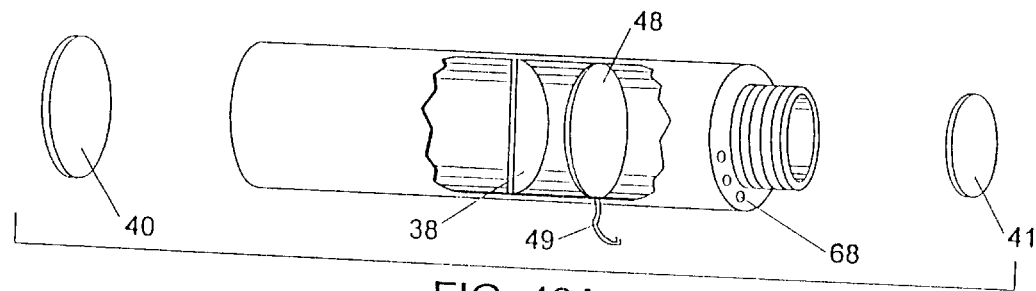
FIGS. 40A, 40B, 40C, and 40D show alternative positions for the electric switched quarter-wave retarder.

The polarization orientation of the leading linear polarizing filter 40 in FIG. 37 must be parallel to the polarization orientation of the electric switched quarter-wave retarder 48 when the electric switched quarter-wave retarder is powered and is in one or the other of its two plus or minus 45° positions. When the leading linear polarizing filter 40 is in the light path prior to the lens system it is manually adjustable for alignment. When the linear polarizing filter is internal to the lens system as with 40 in FIG. 39A, or is applied to a lens as 67 in FIG. 39B, adjustment is made by altering the position of the electric switched quarter-wave retarder. When the electric switched quarter-wave retarder is also inside the lens system 48 in FIG. 40A, adjustment is manufactured into all components of the lens system. The means of orientation is not intended to be limiting, however, as it is well known that a linear polarizing filter can be oriented using any of a number of well known methods. Any such method may nevertheless be employed in the invention and those skilled in the optic arts will readily be able to extend this principle to any method of orientation.

As shown in FIG. 37, an electric switched quarter-wave retarder 48 is placed anywhere in the light path between the leading linear polarizing filter 40 and the final linear polarizing filter 41. Position 48 is the preferred implementation because it requires a component of minimal expense (smaller size). FIGS. 40A, 40B, 40C, and 40D show other acceptable positions. The electric switched quarter-wave retarder may be positioned anywhere in the optical path between the leading linear polarizing filter 40, and the final linear polarizing filter 41. The position of the electric switched quarter-wave retarder is irrespective of the position of the passive half-wave retarder 38. The electric switched quarter-wave retarder can be placed inside the lens and in the light path subsequent to the passive half-wave retarder 38, as in FIG. 40A at 48, or inside the lens and in the light path prior to the passive half-wave retarder 38, as in FIG. 40B at 48, or in the light path prior to the lens and in the light path subsequent to the leading linear polarizing filter 40, as in FIG. 40C at 48, or in the light path subsequent to the lens and in the light path prior to the final linear polarizing filter 41, as in FIG. 40D at 48.

In FIG. 37, the orientation of the electric switched quarter-wave retarder 48 parallels that of the leading linear polarizing filter 40. The two parallel each other when the electric switched quarter-wave retarder is in one or the other of its electrically energized orientations. When the electric switched quarter-wave retarder is installed in an external housing prior to the lens system as at 48 of FIG. 40C it may or may not be made adjustable. When the electric switched quarter-wave retarder is installed inside the lens system, as at 48 of FIG. 40B or FIG. 40A, the leading linear polarizing filter is adjustable when external at 40. When both the electric switched quarter-wave retarder is internal, and the linear polarizing filter is fixed, the lens systems may be manufactured in permanent correct alignment. When the electric switched quarter-wave retarder is inside the camera body, it is adjustable when the camera body allows, otherwise it is non adjustable. When the electric switched quarter-wave retarder is non-adjustable, then either the leading linear polarizing filter is adjustable, or the lens system is manufactured to permanently align with the fixed electric switched quarter-wave retarder.

Figure 40B:
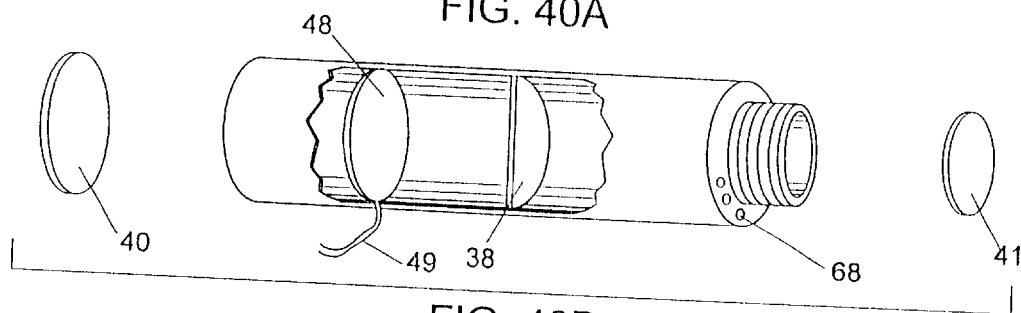
Figure 40C:
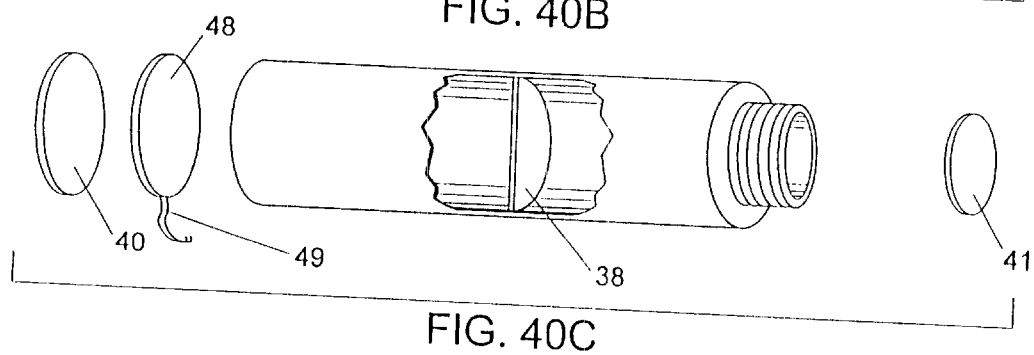
Figure 40D:
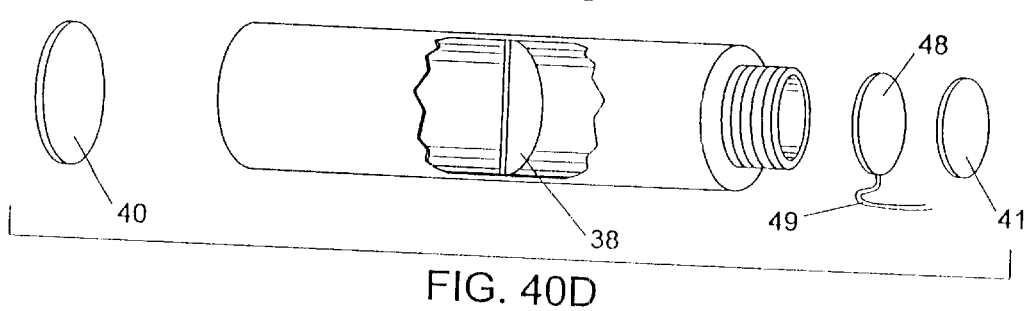
Figure 41:
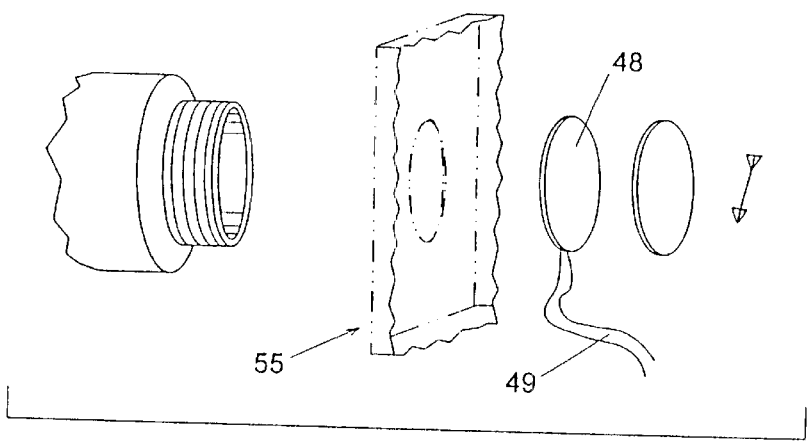
FIG. 41 shows that the electric switched quarter-wave retarder may be inside the camera body.

The electric switched quarter-wave retarder requires two different voltage potentials to set it into one or the other of its polarizing effecting orientations. When the electric switched quarter-wave retarder is internal, as at 48 of FIG. 40A or FIG. 40B, energy is supplied either via a corresponding external cable 49 or via electrical contacts 68 in the lens system's housing. When the electric switched quarter-wave retarder is external, FIG. 40C or FIG. 40D, energy is supplied via external wires 49. As shown in FIG. 41, when the electric switched quarter-wave retarder 48 is inside the camera body 55, energy is provided via the internal camera body wires 49.

Figure 42A:
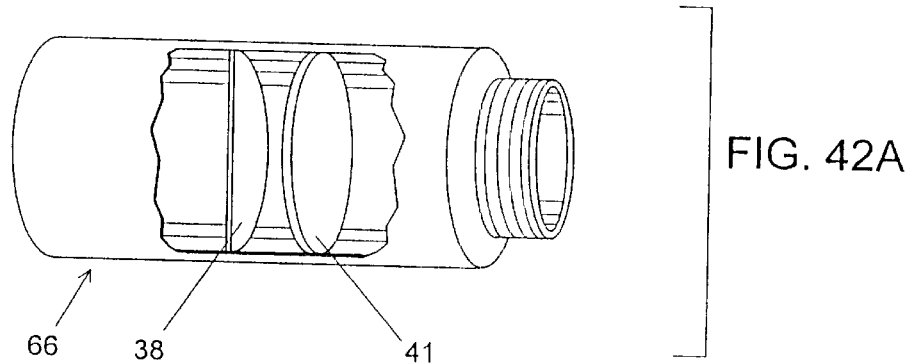
FIGS. 42A and 42B show alternative positions for the final linear polarizing filter.
Figure 42B:
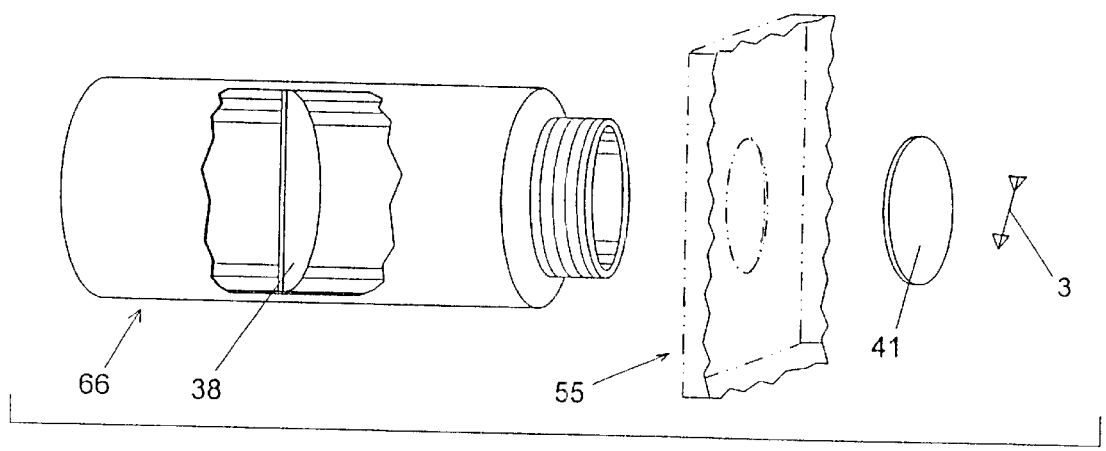

In FIG. 37, the final linear polarizing filter 41 is placed anywhere in the light path between the passive half-wave retarder 38 and the image plane 3. The preferred implementation is outside the lens system at 41 and in proximity to the electric switched quarter-wave retarder 48, because this placement allows the lens system to be used for other purposes when not being dedicated to stereovision use. Other locations for the final linear polarizing filter are shown in FIGS. 42A and 42B. The final linear polarizing filter, when inside the lens system 66, must be in the light path subsequent to the passive half-wave retarder 38, as at 41 in FIG. 42A; when the final linear polarizing filter is inside the camera body 55, it must be in the light path prior to the image plane 3, as at 41 in FIG. 42B.

As in FIG. 37, the final linear polarizing filter 41 has its polarization orientation oriented in parallel with the polarization orientation of the leading linear polarizing filter 40. When the final linear polarizing filter outside the lens system as at 41, it may be adjustable to achieve proper orientation. When the final linear polarizing filter is inside the lens system, as in FIG. 42A, or inside the camera body, as in FIG. 42B, the final linear polarizing filter may be internally adjustable, or may be manufactured to be in the correct alignment.

J. A Generic Video Adapter

Figure 43:
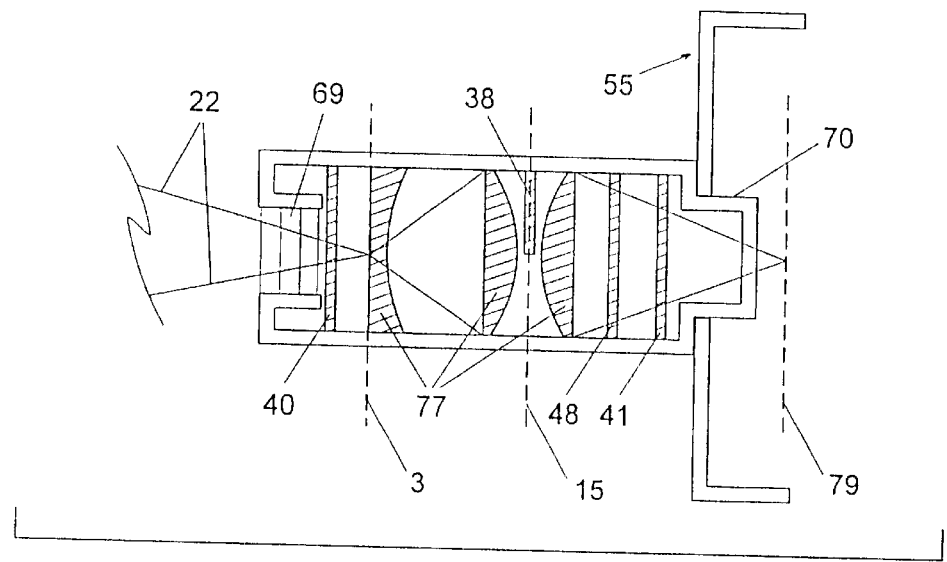
FIG. 43 shows a diagrammatic depiction of the video adapter.

The sixth embodiment, as shown diagrammatically in FIG. 43, is a video lens adapter capable of enabling a wide variety of video lenses and cameras to produce stereoscopic images. This adapter works with any lens that can be mounted at mount point 69. This adapter works with any video camera that will accept the adapter's mounting hardware 70. The adapter captures the lens output image as represented by lines 22, and relays that image from the original image plane represented by the dashed line 3 to the video camera's new image plane represented by the dashed line 79. The image plane represented by the dashed line 79 of the video camera 55 is the front surface of an Image Orthicon tube, a CCD array, or any other image recording surface. The video camera is digital or analog.

The video lens adapter is capable of producing a sequence of images that can later be viewed in 3D, also called stereovision or human stereopsis. FIG. 43 illustrates diagrammatically such an adapter.

The adapter is designed to allow a lens to be mounted at the adapter's front end 69, and to allow the adapter to be mounted to a camera body, at 70. The preferred implementation is that the front and rear mounts be female and male C-mounts respectively. This preference is not, however, intended to be limiting, because it is well known there are many different standards for lens mounts. Canon, for example, uses EOS mounts for most of its cameras, and many industrial lenses and cameras use T-mounts. Such other mounts may nevertheless be used in conjunction with this adapter, either at the front as a lens mount, or at the rear as a camera mount, or both, and those skilled in the mechanical arts will be readily able to extend the present principle to any suitable lens mount.

A relay lens system, bracketed by 77, inside the adapter, gathers the image 22 from the attached lens that normally focuses at the original image plane represented by the dashed line 3, and relays that image to a new image plane represented by the dashed line 79 inside the camera. The relay lens system as depicted is not, however, intended to be limiting, because optical theory allows relays lens systems to be constructed in a variety of ways. The only requirements for the relay lens system are that it create a conjugate of the lenses aperture stop—the position of which is indicated by the dashed line 15, and that it copy unaltered the original image plane represented by the dashed line 3 to the new image plane represented by the dashed line 79. Any suitable relay lens system may nevertheless be employed in the invention and those skilled in the optic arts will be readily able to extend the present principle to any relay lens system that satisfies the two requirements.

The relay lens system shown bracketed by 77 is depicted with simple lenses for the purpose of illustration. In actual practice, such relay lens systems are composed of compound lenses that are achromatic with spherical aberrations corrected to produce a sharp and clear image. This depiction as with simple lenses is not intended, however, to be limiting because it is well known that more complex lenses will produce a superior image. Any quality of lens may nevertheless be employed in this invention and those skilled in the optic arts will be readily be able to employ lenses of any desired quality.

A passive half-wave retarder 38 is placed at the conjugate of the lens aperture stop that is created by the adapter—the position of which is indicated by the dashed line 15.

Figure 44:
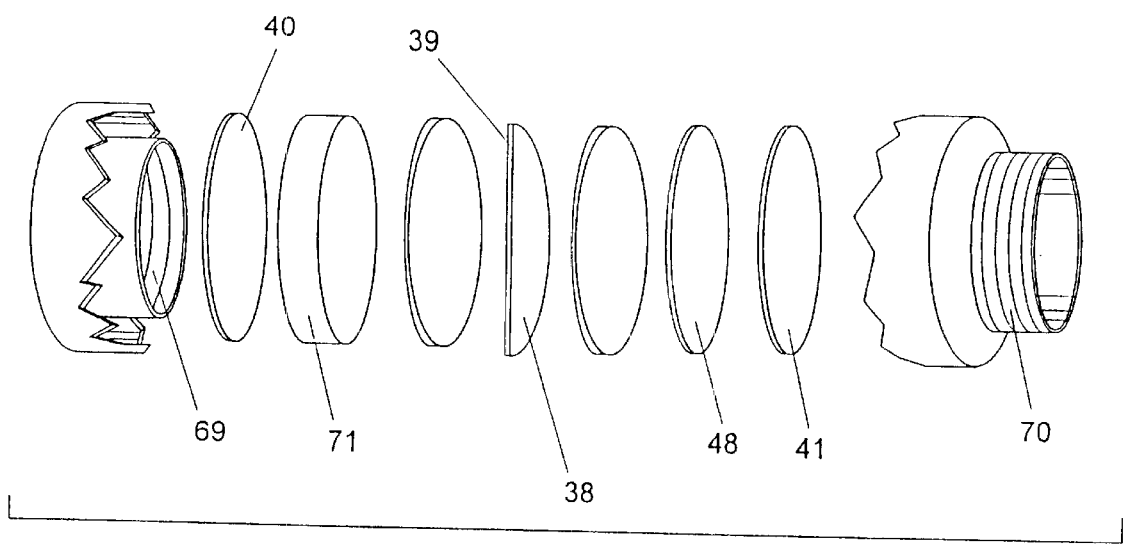
FIG. 44 shows an exploded view of the video adapter.

FIG. 44 is an exploded view of the adapter. It shows that the passive half-wave retarder 38 covers one-half the area of the aperture stop with the bisecting edge 39 oriented vertically or near vertically. The vertical orientation is relative to normal upright orientation of the camera to which the adapter is attached.

As shown in FIG. 44, a leading linear polarizing filter 40 is interposed in the light path between the lens mounted at 69 and the passive half-wave retarder 38. The ideal position is between the lens mounting hole at 69 and the front element of the relay lens system 71. This position allows the front linear polarizing filter to protect the front surface of the front relay lens element from contaminants. Another position that is desirable is inside the lens mounting 69. In that position the front analyzing polarizer servers as a seal for the adapter as a whole, a desirable characteristic for medical use. Any position for the front linear polarizing filter may be employed in the invention so long as it is between the lens mounting hole and the passive half-wave retarder, and those skilled in the optic arts will readily be able to extend this principle to any acceptable position.

The polarization orientation of the leading linear polarizing filter 40 must be parallel to the polarization orientation of the electric switched quarter-wave retarder 48 or other type of electro-optical polarization rotation material when the electric switched quarter-wave retarder is powered and is in one of its two plus or minus 45° positions.

As shown in FIG. 44, an electric switched quarter-wave retarder 48 is placed anywhere in the light path between the leading linear polarizing filter 40 and the final linear polarizing filter 41. Position 48 is the preferred implementation because it requires a component of minimal expense (smaller size). FIGS. 40B and 40C show that the electric switched quarter-wave retarder works equally well in the light path prior to the passive half-wave retarder. In FIG. 44, the electric switched quarter-wave retarder 48 may be positioned anywhere in the optical path between the leading linear polarizing filter 40, and the final linear polarizing filter 41. The position of the electric switched quarter-wave retarder is irrespective of the position of the passive half-wave retarder 38.

The orientation of the electric switched quarter-wave retarder 48 parallels that of the leading linear polarizing filter 40. The two parallel each other when the electric switched quarter-wave retarder is in one or the other of its electrically energized orientations.

As shown in FIG. 44, the final linear polarizing filter 41 is placed anywhere in the light path between the passive half-wave retarder 38 and the camera mount point 70. The preferred implementation is near to or inside the camera mount 70. When inside the camera mount, the final linear polarizing filter acts to seal the adapter from contaminants, as for medical use.

The final linear polarizing filter 41 has its polarization orientation oriented in parallel with the polarization orientation of the leading linear polarizing filter 40.

K. A Stereoscopic Light-Valve

Figure 45:
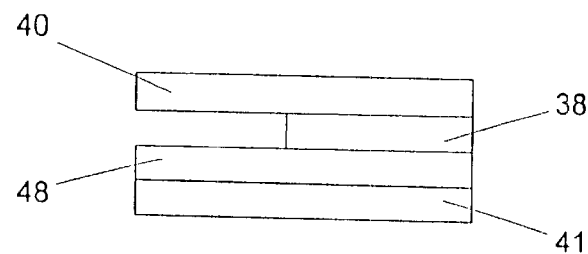
FIG. 45 shows the components that make up the light-valve.

The seventh embodiment, as shown diagrammatically in FIG. 45, is a stereoscopic light-valve capable of insertion into to aperture stop, or the conjugate of the aperture stop, of any imaging lens system to enable that lens system to produce stereoscopic video or motion picture image sequences. This stereoscopic light-valve can be retrofitted into existing lens system and can be manufactured into new lens system. Examples of such lens systems include microscope objectives, endoscopes, video lenses, and motion picture lenses. Although these examples are the only ones cited, they are not intended to be limiting. Any imaging lens can be used to exploit this stereoscopic light-valve and such unforeseen applications are considered a part of this embodiment.

The stereoscopic light-valve is capable of producing a sequence of images that can later be viewed in 3D, also called stereovision or human stereopsis. FIG. 45 illustrates diagrammatically such a stereoscopic light-valve.

The stereoscopic light-valve is a sandwich made of four components. A leading linear polarizing filter 40 is first in the light path. A final linear polarizing filter 41 is last in the light path. Between the two is a passive half-wave retarder 38 and an electric switched quarter-wave retarder 48. The linear polarizing filters 40 and 41 must be first and last in the light path. The passive half-wave retarder 38 and an electric switched quarter-wave retarder 48 can appear in the order shown or in the reverse order with no difference in function.

The stereoscopic light-valve is constructed as thin as possible to avoid space conflict with any lens elements that surround the aperture stop. In the event that materials prevent a sufficiently thin construct such that the entire stereoscopic light-valve occupies only the space of the aperture stop, the stereoscopic light-valve is placed such that the passive component, the passive half-wave retarder, is precisely at the aperture stop, or one of the aperture stop's conjugates.

Figure 46:
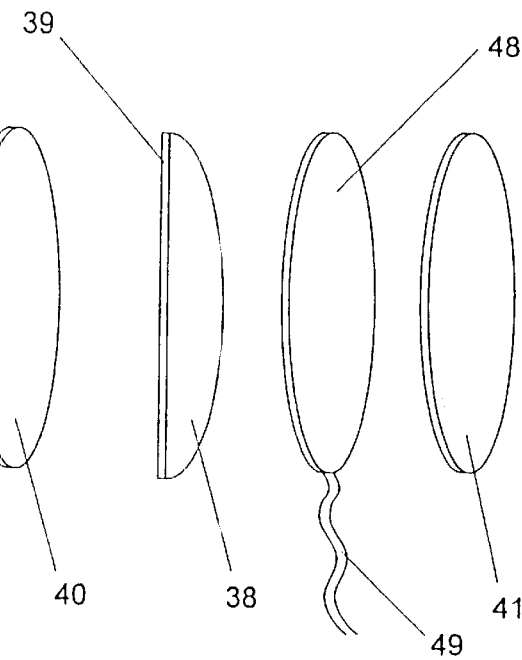
FIG. 46 shows an exploded view of the light-valve.

FIG. 46 is an exploded view of the stereoscopic light-valve. It shows that the passive half-wave retarder 38 covers one-half the area of the aperture stop with the bisecting edge 39 oriented vertically or near vertically. The vertical orientation is relative to normal upright orientation of the lens into which the adapter is installed.

The polarization orientation of the leading linear polarizing filter 40 must be parallel to the polarization orientation of the electric switched quarter-wave retarder 48 when the electric switched quarter-wave retarder is powered and is in one of its two plus or minus 45° positions.

The final linear polarizing filter 41 has its polarization orientation oriented in parallel with the polarization orientation of the leading linear polarizing filter 40.

Figure 47:
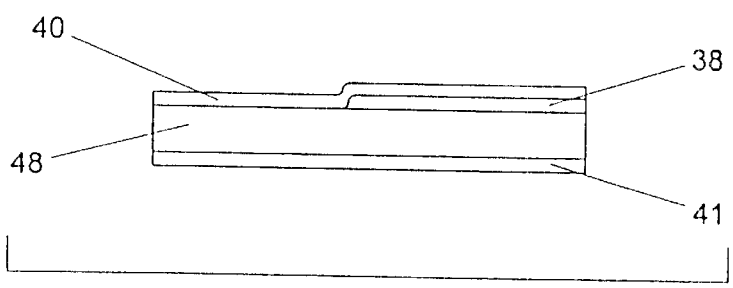
FIG. 47 shows that the passive half-wave retarder can be applied as a coating to a glass disk.

FIG. 47 shows that the stereoscopic light-valve can be construct from coatings on the electric switched quarter-wave retarder 48. A quarter-wave retarder 38 is first coated to one half of one of the electric switched quarter-wave retarder's faces. Two equally aligned linear polarizing filters are then coated to both sides of the faces of the electric switched quarter-wave retarder, the leading linear polarizing filter 40 to one face, and the trailing linear polarizing filter 41 to the other face.

I claim:

1. A method for encoding depth information of a subject in a multiple element lens system, comprising:

providing at least a first optical encoder located at least substantially at an aperture stop or a conjugate thereof of a multiple element lens system, the aperture stop or conjugate thereof being located within a multiple element lens system, and passing light containing the depth information through the at least a first optical encoder, wherein the first optical encoder covers only a portion of the aperture stop or conjugate thereof so as to create first and second light portions having transverse polarization orientations, wherein the at least a first optical encoder encodes a third portion of the light, wherein the first and second light portions provide horizontal head-motion parallax and the third portion provides vertical head-motion parallax.

2. The method of claim 1, wherein the light has a common polarization orientation before contacting the first optical encoder and the polarization orientations of the first and second light portions are at least substantially orthogonal to one another after contacting the first optical encoder and wherein the third light portion is encoded differently from the first and second light portions.

3. The method of claim 1, wherein the first and second light portions follow a common optical path and converge on an image plane and wherein the multiple element lens system comprises a plurality of lenses and the aperture stop or conjugate thereof is positioned between at least two of the plurality of lenses.

4. A method of claim 1, further comprising before the passing step:
first passing an input light beam through at least a first polarizing filter to form the light wherein the first polarizing filter causes the light to have a common polarization orientation; and further comprising after the passing step:
second passing each of the first and second light portions through separate respective polarizing filters, wherein the separate polarizing filters have at least substantially orthogonal polarization orientations.

5. The method of claim 4, wherein the first polarizing filter and first optical encoder are part of an integral unit.

6. The method of claim 4, wherein the respective polarizing filters and the first optical encoder are part of an integral unit.

7. The method of claim 4, further comprising a polarization rotator and wherein the polarization rotator is positioned between the first polarizing filter and the respective polarizing filters and the first and respective polarizing filters, first optical encoder and polarization rotator, are part of an integral unit.

8. The method of claim 7, wherein the polarization rotator is a variable retarder.

9. The method of claim 4, wherein the first polarizing filter is a coating on a front element of a lens system.

10. The method of claim 4, wherein the respective polarizing filters are coatings on a substrate.

11. The method of claim 4, wherein the first polarizing filter has substantially the same polarization orientation as the first optical encoder.

12. The method of claim 4, wherein one of the respective polarizing filters has substantially the same polarization orientation as the first optical encoder.

13. The method of claim 4, wherein the first polarizing filter is a coating on the substrate.

14. A method of claim 1, wherein the first optical encoder is a retarder located within an objective lens.

15. A method of claim 1, further comprising:
rotating the polarization orientation of at least one of first and second light portions.

16. A method of claim 15, wherein the rotation is performed by a switched retarder and the switched retarder is orientated such that, when the switched retarder is in a switched mode, the polarization orientation of the switched retarder is substantially the same as the polarization orientation of one of first and second light portions.

17. The method of claim 16, wherein the switched retarder is a liquid crystal retarder.

18. A method of claim 1, further comprising before the passing step:
passing the light through a relay lens system to form a conjugate of the aperture stop and wherein the first optical encoder is located at or near the conjugate of the aperture stop.

19. The method of claim 1, further comprising before the passing step:
passing the light through at least a first polarizing filter to provide filtered light having a common polarization orientation and wherein the polarization orientations of the first and second light portions are at least substantially orthogonal to one another.

20. The method of claim 1, further comprising after the passing step:
passing one of the first and second light portions through at least a first analyzing polarizing filter having at least substantially the same polarization orientation as the one of the first and second light portions; and
passing the other of the first and second light portions through at least a second analyzing polarizing filter having at least substantially the same polarization orientation as the other of the first and second light portions.

21. The method of claim 1, wherein the light is not collimated at the aperture stop or conjugate thereof and wherein the at least a first optical encoder is positioned at a distance from a pupil of the multiple element lens system.

22. The method of claim 1, further comprising at least a first polarizing beam splitter positioned so as to contact the light portions.

23. The method of claim 1, wherein the light is not collimated at the aperture stop or conjugate thereof.

24. A multiple element lens system for encoding depth information of a subject, comprising:
lens means for receiving light containing the depth information, wherein the lens means comprises multiple lenses; and
at least a first optical encoding means, positioned at least substantially at an aperture stop or a conjugate thereof, for creating first and second light portions having transverse polarization orientations, wherein the aperture stop or conjugate thereof is positioned between adjacent lenses in the lens means and wherein the at least a first optical encoding means filter encodes a third portion of the light, wherein the first and second light portions provide horizontal head-motion parallax and the third portion provides vertical head-motion parallax.

25. The system of claim 24, wherein the light has a common polarization orientation before contacting the at least first optical encoding means, wherein the polarization orientations of the first and second light portions are at least substantially orthogonal to one another after contacting the at least first optical encoding means, and wherein the at least first optical encoding means covers only a portion of the aperture stop or conjugate thereof and wherein the third light portion is encoded differently from the first and second light portions.

26. The system of claim 24, wherein the first and second light portions follow a common optical path and converge on a common image plane and the aperture stop or conjugate thereof at which the at least first optical encoding means is positioned is not located at a pupil.

27. A system of claim 24, wherein the lens means comprises:
at least a first polarizing filter for receiving an input light beam to form the light wherein the first polarizing filter causes the light to have a common polarization orientation;
and further comprising in the optical path after the first optical encoding means:
separate respective polarizing filters for filtering each of the first and second light portions, wherein the separate polarizing filters have at least substantially orthogonal polarization orientations.

28. The system of claim 27, wherein the first polarizing filter and first optical encoding means are part of an integral unit.

29. The system of claim 27, wherein the respective polarizing filters and the first optical encoding means are part of an integral unit.

30. The system of claim 27, further comprising a polarization rotator and wherein the polarization rotator is positioned between the first polarizing filter and the respective polarizing filters and the first and respective polarizing filters, first optical encoding means and polarization rotator, are part of an integral unit.

31. The system of claim 30, wherein the polarization rotator is a variable retarder.

32. The system of claim 27, wherein the first polarizing filter is a coating on a front element of the lens means.

33. The system of claim 27, wherein the respective polarizing filters are coatings on a substrate.

34. The system of claim 27, wherein the first polarizing filter has substantially the same polarization orientation as the first optical encoding means.

35. The system of claim 27, wherein one of the respective polarizing filters has substantially the same polarization orientation as the first optical encoding means.

36. The system of claim 27, wherein the first polarizing filter is a coating on the substrate.

37. A system of claim 24, wherein the first optical encoding means is a retarder located in an objective lens.

38. A system of claim 24, further comprising:
means for rotating the polarization orientation of at least one of first and second light portions.

39. A system of claim 38, wherein the means for rotating is a switched retarder and the switched retarder is orientated such that, when the switched retarder is in a switched mode, the polarization orientation of the switched retarder is substantially the same as the polarization orientation of one of first and second light portions.

40. The system of claim 39, wherein the switched retarder is a liquid crystal retarder.

41. A system of claim 24, wherein the lens means comprises:
a relay lens system that forms a conjugate of the aperture stop and wherein the first optical encoding means is located at the conjugate of the aperture stop.

42. The system of claim 24, wherein the lens means comprises:
at least a first polarizing filter that provides filtered light having a common polarization orientation.

43. The system of claim 24, further comprising:
at least a first analyzing polarizing filter positioned to receive one of the first and second light portions and having at least substantially the same polarization orientation as the one of the first and second light portions; and
at least a second analyzing polarizing filter positioned to receive the other of the first and second light portions and having at least substantially the same polarization orientation as the other of the first and second light portions.

44. The system of claim 24, wherein the light is not collimated at the aperture stop and/or conjugate thereof.

45. The system of claim 24, further comprising at least a first polarizing beam splitter positioned so as to contact the light portions.

46. A multiple element lens system for encoding depth information of a subject, comprising:
a plurality of lenses operable to receive light containing the depth information; and
at least a first optical encoder, positioned at least substantially at an aperture stop or a conjugate thereof, for creating first and second light portions having transverse polarization orientations, wherein the aperture stop or conjugate thereof at which the at least a first optical encoder is positioned is located between adjacent lenses of the plurality of lenses and wherein the at least a first optical encoder encodes a third portion of the light, wherein the first and second light portions provide horizontal head-motion parallax and the third portion provides vertical head-motion parallax.

47. The system of claim 46, wherein the light has a common polarization orientation before contacting the at least a first optical encoder, wherein the polarization orientations of the first and second light portions are at least substantially orthogonal to one another, wherein the at least first optical encoder covers only a portion of the aperture stop or conjugate thereof, and wherein the third light portion is encoded differently from the first and second light portions.

48. The system of claim 46, wherein the first and second light portions follow a common optical path and converge on a common image plane and wherein the at least a first optical encoder is not positioned at or near a pupil.

49. A system of claim 46, wherein the one or more lenses comprises:
at least a first polarizing filter operable to filter an input light beam to form the light wherein the first polarizing filter causes the light to have a common polarization orientation;
and further comprising in the optical path after the first optical encoder:
separate respective polarizing filters operable to filter each of the first and second light portions, wherein the separate polarizing filters have at least substantially orthogonal polarization orientations.

50. The system of claim 49, wherein the first polarizing filter and first optical encoder are part of an integral unit.

51. The system of claim 49, wherein the respective polarizing filters and the first optical encoder are part of an integral unit.

52. The system of claim 49, further comprising a polarization rotator and wherein the polarization rotator is positioned between the first polarizing filter and the respective polarizing filters and the first and respective polarizing filters, first optical encoder and polarization rotator, are part of an integral unit.

53. The system of claim 49, wherein the first polarizing filter is a coating on a front element of a lens in the one or more lenses.

54. The system of claim 49, wherein the respective polarizing filters are coatings on a substrate.

55. The system of claim 49, wherein the first polarizing filter has substantially the same polarization orientation as the first optical encoder.

56. The system of claim 49, wherein one of the respective polarizing filters has substantially the same polarization orientation as the first optical encoder.

57. The system of claim 49, wherein the first polarizing filter is a coating on the substrate.

58. A system of claim 46, wherein the first optical encoder is a retarder located inside of an objective lens.

59. A system of claim 46, further comprising:
   a polarization rotator operable to rotate the polarization orientation of at least one of first and second light portions.

60. A system of claim 59, wherein the polarization rotator is a switched retarder and the switched retarder is orientated such that, when the switched retarder is in a switched mode, the polarization orientation of the switched retarder is substantially the same as the polarization orientation of one of first and second light portions.

61. The system of claim 60, wherein the switched retarder is a liquid crystal retarder.

62. A system of claim 46, wherein the one or more lenses comprises:
   a relay lens system that forms a conjugate of the aperture stop and wherein the first optical encoder is located at the conjugate of the aperture stop.

63. The system of claim 46, wherein the one or more lenses comprises:
   at least a first polarizing filter operable to provide filtered light having a common polarization orientation.

64. The system of claim 46, further comprising:
   at least a first analyzing polarizing filter operable to filter one of the first and second light portions and having at least substantially the same polarization orientation as the one of the first and second light portions; and
   at least a second analyzing polarizing filter operable to filter the other of the first and second light portions and having at least substantially the same polarization orientation as the other of the first and second light portions.

65. The system of claim 46, wherein the light is not collimated at the aperture stop or conjugate thereof.

66. The system of claim 46, further comprising at least a first polarizing beam splitter positioned so as to contact the light portions.

67. A method for encoding depth information of a subject in a multiple element lens system, comprising:
   providing a multiple element lens system having an aperture stop, the multiple element lens system comprising an objective lens and at least a first optical encoder, wherein the objective lens is positioned at the aperture stop or a conjugate thereof, the aperture stop or conjugate thereof is located within the multiple element lens system, and the at least a first optical encoder is positioned inside of the objective lens;
   receiving, with the lens system, light containing depth information regarding a subject; and
   passing the light through the at least a first optical encoder, wherein the first optical encoder covers only a portion of the aperture stop or conjugate thereof so as to create first and second light portions having transverse polarization orientations.

68. The method of claim 67, wherein the light has a common polarization orientation before contacting the first optical encoder and the polarization orientations of the first and second light portions are at least substantially orthogonal to one another after contacting the first optical encoder.

69. The system of claim 67, wherein the first and second light portions follow a common optical path and converge on a common image plane and wherein the multiple lens elements comprise a plurality of lenses and the aperture stop or conjugate thereof at which the first encoder is positioned is located between adjacent lenses.

70. A method of claim 67, further comprising before the passing step:
   first passing an input light beam through at least a first polarizing filter to form the light wherein the first polarizing filter causes the light to have a common polarization orientation; and further comprising after the passing step:
   second passing each of the first and second light portions through separate respective polarizing filters, wherein the separate polarizing filters have at least substantially orthogonal polarization orientations.

71. A method of claim 70, further comprising:
   rotating the polarization orientation of at least one of first and second light portions.

72. A method of claim 71, wherein the rotation is performed by a switched retarder and the switched retarder is orientated such that, when the switched retarder is in a switched mode, the polarization orientation of the switched retarder is substantially the same as the polarization orientation of one of first and second light portions.

73. A method of claim 67, wherein the at least a first optical encoder is a retarder.

74. The method of claim 67, further comprising before the passing step:
   passing the light through at least a first polarizing filter to provide filtered light having a common polarization orientation and wherein the polarization orientations of the first and second light portions are at least substantially orthogonal to one another.

75. The method of claim 67, further comprising after the passing step:
   passing one of the first and second light portions through at least a first analyzing polarizing filter having at least substantially the same polarization orientation as the one of the first and second light portions; and
   passing the other of the first and second light portions through at least a second analyzing polarizing filter having at least substantially the same polarization orientation as the other of the first and second light portions.

76. A method for encoding depth information of a subject in a multiple element lens system, comprising:
   providing at least a first optical encoder located at least substantially at an aperture stop or a conjugate thereof of a multiple element lens system, the aperture stop or conjugate thereof being located within a multiple element lens system, wherein the at least a first optical encoder is located inside of an objective lens, the objective lens being positioned at the aperture stop or a conjugate thereof and
   passing light containing the depth information through the at least a first optical encoder, wherein the first optical encoder covers only a portion of the aperture stop or conjugate thereof so as to create first and second light portions having transverse polarization orientations.

* * * * *